(12) United States Patent
Okuno et al.

(10) Patent No.: US 10,326,893 B2
(45) Date of Patent: Jun. 18, 2019

(54) IMAGE FORMING APPARATUS, INFORMATION NOTIFYING METHOD, AND NON-TRANSITORY COMPUTER-READABLE RECORDING MEDIUM STORING INSTRUCTIONS THEREFOR

(71) Applicant: BROTHER KOGYO KABUSHIKI KAISHA, Nagoya, Aichi (JP)

(72) Inventors: Tetsuya Okuno, Aichi (JP); Hironori Takasaki, Ogaki (JP); Tony Lee, Aichi (JP); Katsunori Enomoto, Toyokawa (JP); Toyoshi Adachi, Kakamigahara (JP); Yuqing Liu, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/896,238

(22) Filed: Feb. 14, 2018

(65) Prior Publication Data
US 2018/0234560 A1    Aug. 16, 2018

(30) Foreign Application Priority Data

Feb. 15, 2017   (JP) ................ 2017-025628

(51) Int. Cl.
*H04N 1/00* (2006.01)
*H04N 1/32* (2006.01)
*G06F 16/955* (2019.01)

(52) U.S. Cl.
CPC ..... *H04N 1/00233* (2013.01); *G06F 16/9554* (2019.01); *H04N 1/00206* (2013.01); *H04N 1/32128* (2013.01)

(58) Field of Classification Search
CPC .......... G06F 17/30879; H04N 1/00206; H04N 1/00233; H04N 1/32128
See application file for complete search history.

(56) References Cited

U.S. PATENT DOCUMENTS

2007/0276270 A1* 11/2007 Tran .............. A61B 5/0022
                                                        600/508
2012/0113464 A1*  5/2012 Inoue ............ H04N 1/00151
                                                        358/1.15
(Continued)

FOREIGN PATENT DOCUMENTS

JP    2001-236395 A    8/2001
JP    2003-173373 A    6/2003
JP    2013-105302 A    5/2013

*Primary Examiner* — Negussie Worku
(74) *Attorney, Agent, or Firm* — Scully, Scott, Murphy & Presser, P.C.

(57) ABSTRACT

In an image forming apparatus, a controller is configured to receive an e-mail stored in a mail server through a network interface, generate identification information corresponding to image data attached to the received e-mail, store, in a storage, the identification information, a transmission source address of the e-mail to which to the image data corresponding to the identification information is attached, and the image data corresponding to the identification information, in an associated manner, cause a printer to print a particular image corresponding to the identification information, identify the identification information in the particular image read by an image reader, retrieve, from the storage, the transmission source address of the e-mail to which the image data corresponding to the identification information identified in the identifying process, and transmit an e-mail addressed to the transmission source address retrieved in the address retrieval step to the mail server.

18 Claims, 16 Drawing Sheets

(56) References Cited

U.S. PATENT DOCUMENTS

| | | | |
|---|---|---|---|
| 2012/0206765 A1* | 8/2012 | Nakajo | G06F 3/1239 358/1.15 |
| 2012/0250074 A1* | 10/2012 | Kamppari | G06F 3/1204 358/1.15 |
| 2013/0242335 A1* | 9/2013 | Naitoh | G06K 15/405 358/1.14 |
| 2013/0242342 A1* | 9/2013 | Kawakami | G06Q 30/04 358/1.15 |
| 2014/0078540 A1* | 3/2014 | Ishida | H04N 1/00233 358/1.13 |
| 2014/0253947 A1* | 9/2014 | Akutsu | H04N 1/00217 358/1.14 |
| 2015/0138582 A1* | 5/2015 | Ito | H04N 1/00925 358/1.13 |
| 2015/0146241 A1* | 5/2015 | Lee | H04N 1/00103 358/1.15 |
| 2015/0201094 A1* | 7/2015 | Iwase | H04N 1/41 358/1.15 |
| 2015/0212763 A1* | 7/2015 | Sharpe | G06F 3/126 358/1.15 |
| 2016/0286053 A1* | 9/2016 | Akamine | H04N 1/0023 |
| 2017/0083386 A1* | 3/2017 | Wing | G06F 9/542 |
| 2017/0087868 A1* | 3/2017 | Miyashita | B41J 2/175 |
| 2017/0094447 A1* | 3/2017 | Sasaki | G06F 21/41 |

\* cited by examiner

| ID | TRANSMISSION SOURCE ADDRESS | ATTACHED DATA | STATUS | DISPENSED DATE/TIME | DELIVERED DATE/TIME |
|---|---|---|---|---|---|
| 10011 | user001@aaa.com | user001.pdf | DISPENSED | 2016/10/11/1000 | |
| 10012 | user002@aaa.com | user002.pdf | DISPENSED | 2016/10/10/1800 | |
| 10013 | user003@aaa.com | user003.pdf | DELIVERED | 2016/10/11/1100 | 2016/10/11/1105 |
| 10014 | user004@aaa.com | user004.pdf | ACQUIRED | | |
| 10015 | user005@aaa.com | user005.pdf | ACQUIRED | | |
| 10016 | user005@aaa.com | user006.pdf | ACQUIRED | | |

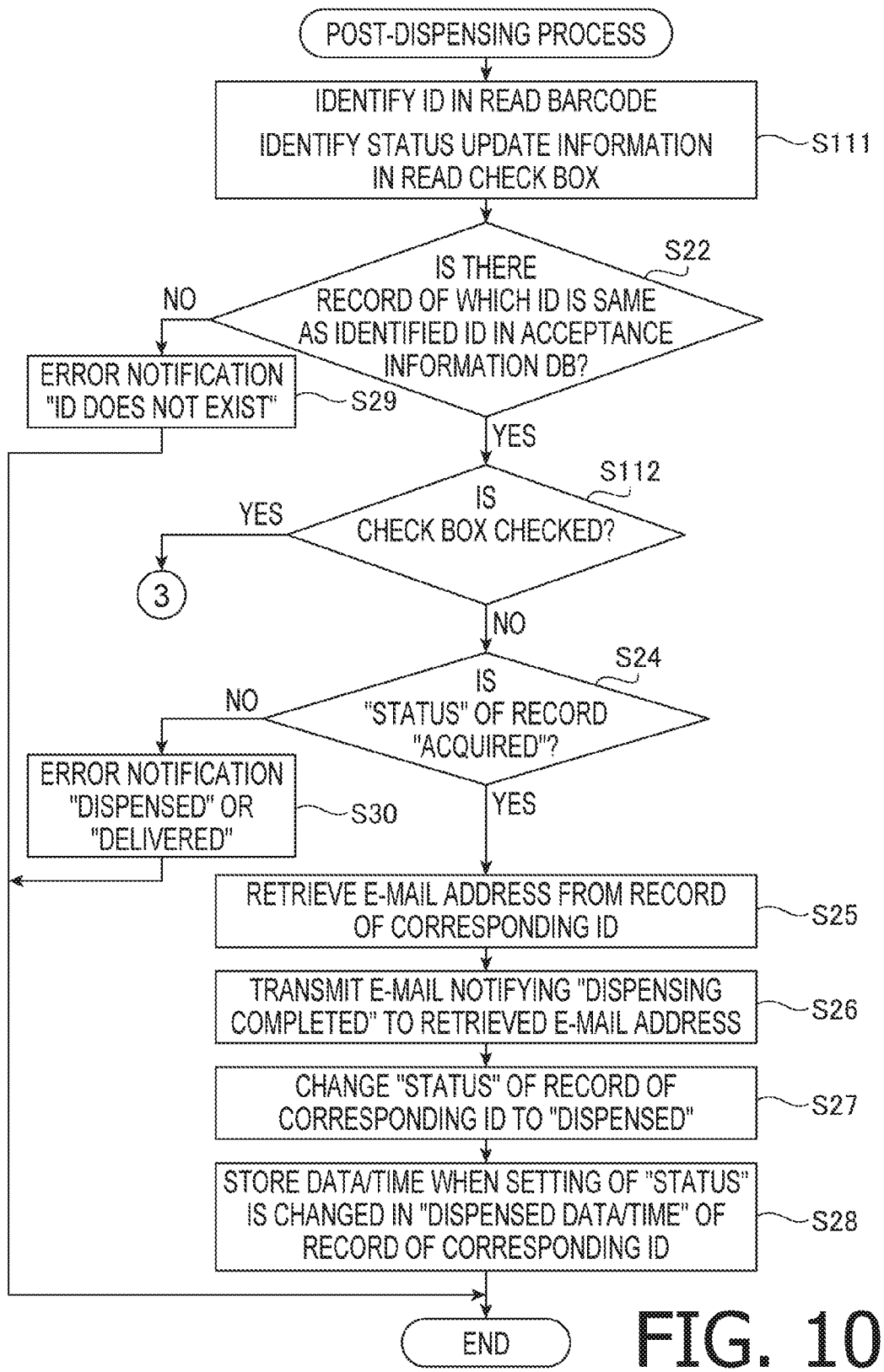

FIG. 13

| ID | TRANSMISSION SOURCE ADDRESS | ATTACHED DATA | STATUS | DISPENSED DATE/TIME | DELIVERED DATE/TIME |
|---|---|---|---|---|---|
| 10011 | user001@aaa.com | user001.pdf | DISPENSED | 2016/10/11/1000 | |
| 10012 | user002@aaa.com | user002.pdf | DISPENSED | 2016/10/10/1800 | |
| 10013 | user003@aaa.com | user003.pdf | DELIVERED | 2016/10/11/1100 | 2016/10/11/1105 |
| 10014 | user004@aaa.com | user004.pdf | ACQUIRED | | |
| 10015 | user005@aaa.com | user005.pdf | ACQUIRED | | |
| 10016 | user005@aaa.com | user006.pdf | ACQUIRED | | |
| 10017 | user007@aaa.com | user007.pdf | REGISTERED | | |
| 10018 | user008@aaa.com | user008.pdf | REGISTERED | | |

35

IMAGE FORMING APPARATUS, INFORMATION NOTIFYING METHOD, AND NON-TRANSITORY COMPUTER-READABLE RECORDING MEDIUM STORING INSTRUCTIONS THEREFOR

CROSS-REFERENCE TO RELATED APPLICATIONS

This application claims priority under 35 U.S.C. § 119 from Japanese Patent Application No. 2017-025628 filed on Feb. 15, 2017. The entire subject matter of the application is incorporated herein by reference.

BACKGROUND

Technical Field

The present disclosures relate to an image forming apparatus, an information notifying method, and a non-transitory computer-readable recording medium storing instructions for the image forming apparatus. More specifically, the present disclosures relate to a technique of transmitting a notification from an image forming apparatus to a communication device.

Related Art

Conventionally, there has been known a technique of transmitting particular information to a communication device possessed by a user to notify the user of particular information. As an example of such a conventional art, there is known an image notifying system configured to notify a customer, who has not yet received medicine at a pharmacy although the medicine has already been ready, of readiness of the medicine.

SUMMARY

In the conventional art as mentioned above, however, a problem as follows is known. That is, in order for the customer, who wishes to receive notification of readiness of the medicine, to receive such a notification, the customer is required to register, in advance, notification information such as a name and an e-mail address with the device which transmits the notification, and relatively troublesome operation is required. Further, if there are errors in the registered notification information, the notification may not be transmitted to a desired destination.

In consideration of the above, the present disclosures provide a solution of the above problem. That is, according to the present disclosures, there is provided a technique which reduces troublesomeness and prevents erroneous input of the notification information in a registration operation.

According to aspects of the disclosures, there is provided an image forming apparatus, having an printer, a communication device configured to communicate with a mail server, an image reader, a storage and a controller. The controller is configured to execute an e-mail reception process of receiving an e-mail stored in the mail server by controlling the communication device, a generating process of generating identification information corresponding to image data attached to the e-mail received in the e-mail reception process, a storing process of storing the identification information, a transmission source address of the e-mail, and the image data in the storage in an associated manner, an image forming process of controlling the printer to print a particular image corresponding to the identification information and an image of the image data corresponding to the identification information on a sheet, an identifying process of identifying the identification information corresponding to the particular image on the sheet read by the image reader, an address retrieval process of retrieving, from the storage, the transmission source address of the e-mail corresponding to the identification information identified in the identifying process, and an e-mail transmission process of controlling the communication device to transmit an e-mail to the transmission source address retrieved in the address retrieval process through the mail server.

According to aspects of the disclosures, there is provided an information notifying method including an e-mail reception step of receiving an e-mail stored in a mail server through a network interface, a generating step of generating identification information corresponding to image data attached to the received e-mail, a storing step of storing, in a storage, the identification information, a transmission source address of the e-mail, and the image data, in an associated manner, a printing step of causing a printer to print a particular image corresponding to the identification information, an identifying step of identifying the identification information in the particular image read by an image reader, an address retrieval step of retrieving, from the storage, the transmission source address of the e-mail to which the image data corresponding to the identification information identified in the identifying step, and an e-mail transmission step of transmitting an e-mail addressed to the transmission source address retrieved in the address retrieval step to the mail server through the network interface.

According to aspects of the disclosures, there is provided a non-transitory computer-readable recording medium storing instructions for an image forming apparatus. The instructions cause, when executed by a computer, the image forming apparatus to execute an e-mail reception process of receiving an e-mail stored in a mail server through a network interface, a generating process of generating identification information corresponding to image data attached to the received e-mail, a storing process of storing, in a storage, the identification information, a transmission source address of the e-mail and the image data, in an associated manner, a printing process of causing a printer to print a particular image corresponding to the identification information, an identifying process of identifying the identification information in the particular image read by an image reader, an address retrieval process of retrieving, from the storage, the transmission source address of the e-mail to which the image data corresponding to the identification information identified in the identifying step, and an e-mail transmission process of transmitting an e-mail addressed to the transmission source address retrieved in the address retrieval step to the mail server through the network interface.

BRIEF DESCRIPTION OF THE ACCOMPANYING DRAWINGS

FIG. 1 is a block diagram showing an electrical configuration of an image forming apparatus according to a first embodiment of the present disclosures.

FIG. 2 schematically shows a data structure of an acceptance information database according to the first embodiment.

FIG. 3 schematically shows an example of a prescription.

FIG. 10 is a flowchart illustrating the post-dispensing process according to the second embodiment.

FIG. 13 schematically shows a data structure of the acceptance information database according to the third embodiment.

DETAILED DESCRIPTION OF THE EMBODIMENTS

Hereinafter, apparatuses according to embodiments of the present disclosures will be described with reference to the accompanying drawings.

First Embodiment

Firstly, an MFP according to a first embodiment will be described, referring to the accompanying drawings.

[Configuration of MFP]

Figure 1:
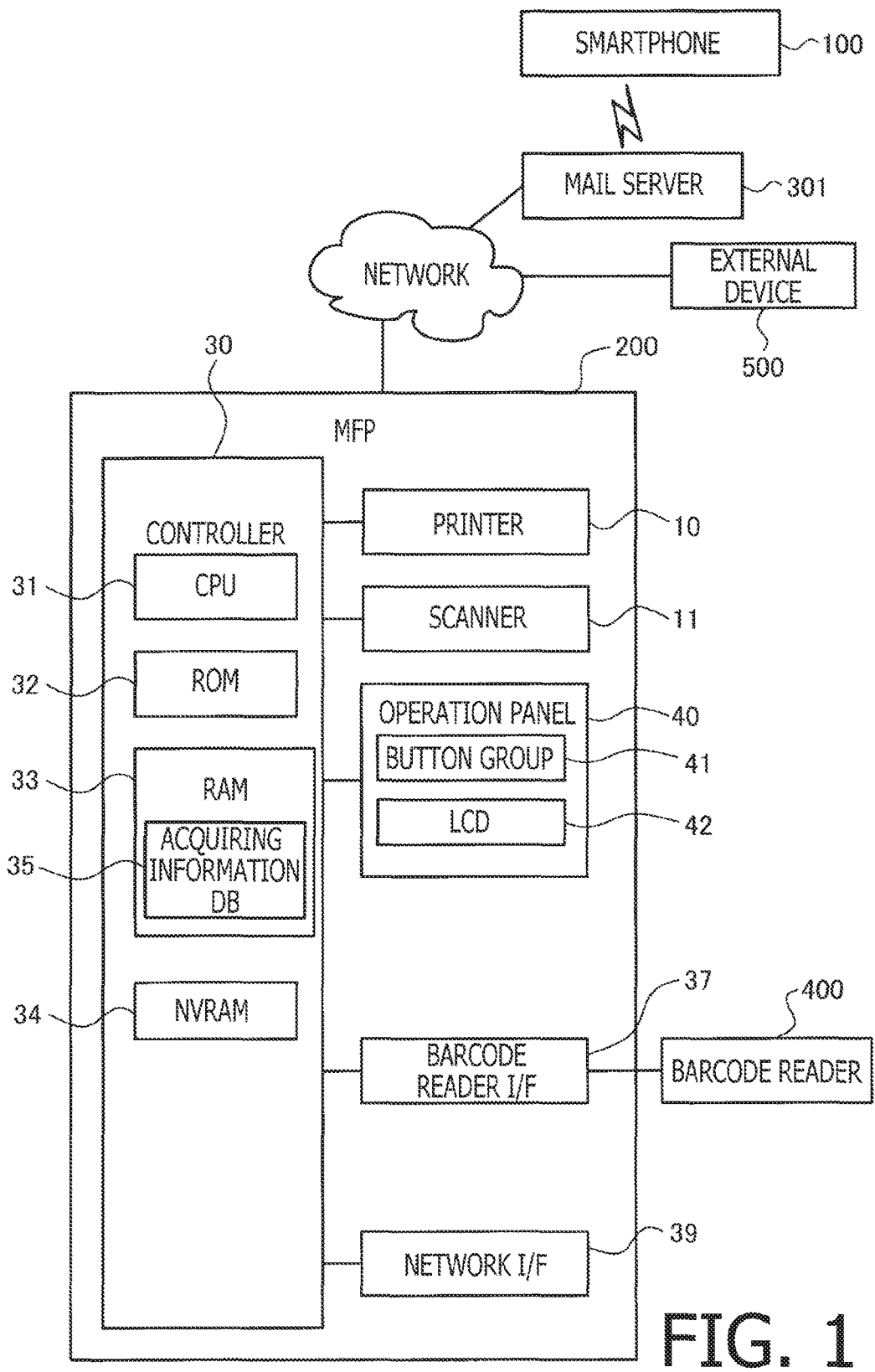

As shown in FIG. 1, an MFP 200 according to the first embodiment is communicatably connected to a mail server 301, to which the MFP 200 itself is registered as a client, through a network. The mail server 301 is configured to control receipt/transmission of e-mails in accordance with requests of clients and/or store the e-mails addressed to the clients. That is, the MFP 200 is capable of transmitting/receiving e-mails to/from other communication devices through the mail server 301. The other communication devices include, for example, a smartphone 100, a mobile communication terminal such as a tablet which can be carried by a user, a personal computer, and the MFP.

The MFP 200 is connected to an external device 500 through the network, and a work log is stored therein. It is noted that the MFP 200 may be connected to the external device 500 through a USB cable or a wireless connection such as a Wi-Fi.

The MFP 200 has a controller 30 including a CPU 31, a ROM 32, a RAM 33 and an NVRAM 34. The controller 30 is connected to an printer 10 configured to print an image on a sheet, a scanner 11 configured to read an image on an original, an operation panel 40 configured to display an operation status of the MFP 200 and accept input operations by a user, a barcode reader I/F 37, and a network I/F 39. The RAM 33 is an example of a storage. The network I/F 39 is an example of a communication device.

The term "controller" 300 is used as a collective term including hardware (e.g., the CPU 31) used to control the MFP 300, and does not necessarily mean a single element of the hardware of the MFP 200. It is noted that the CPU 31 is an example of a controller. The controller 300 may be the controller set forth in the claims.

The printer 10 may be configured to print color images, or only monochromatic (e.g., black-and-white) images.

According to the present embodiment, the printer 10 is configured to print color images. Further, as a printing method, either an electrophotographic imaging method or inkjet printing method may be employed.

The scanner 11 may be configured to execute a color scanning or a monochromatic scanning. According to the present embodiment, the scanner 11 executes the color scanning. Further, a reading mechanism may employ a CCD or a CIS. Further, the scanner 11 may be implemented with an OCR function.

The operation panel 40 has a button group 41 configured to acquire an input operation of the user, and an LCD 42 configured to display messages, setting parameters and the like. The button group 41 includes, for example, an OK button for inputting an instruction to sated an image processing, a cancel button for instructing cancellation of the instruction to start the image processing and the like. The MFP 200 may be configured to display various buttons on the LCD 42 and acquire an instruction by the user based on a position of the LCD 42 pressed/touched by the user (i.e., the LCD may be provided with a touch sensor). It is noted that the button group 41 is an example of an operation device. It is further noted that, when the LCD 42 provided with the touch sensor serves as the touch panel, the LCD 42 is an example of the operation device.

The ROM 32 stores a firmware which is a control program controlling the MFP 200, various settings, and initial values. The RAM 33 and the NVRAM 34 are used as work areas when the various control programs are retrieved and/or as storages in which data is temporarily stored.

The CPU 31 controls respective components in accordance with various programs retrieved from the RAM 32 and/or signals output from various sensors, with storing processing results in the RAM 33 or the NVRAM 34.

It is noted that, when the MFP 200 controls the network I/F 39 and receives e-mails stored in the mail server 301 and addressed to the MFP 200 itself (hereinafter, referred to as "unreceived e-mail"), the RAM 33 stores the received e-mails in accordance with a received order as "unreceived e-mails" of which prescriptions have not been registered or printed, and of which prescriptions have not been acquired. It is noted that an image of a prescription is attached to each e-mail.

In the RAM 33, an acceptance information database 35 is stored. For example, as shown in FIG. 2, the acceptance information database 35 contains a plurality of records each having an "ID" item, a "transmission source address" item, an "attached data" item, a "status" item, a "dispensing data/time" item and a "delivered date/time" item. That is, in the acceptance information database 35, the ID's, the transmission source addresses, information regarding the statuses are stored in an associated manner. Further, in the acceptance information database 35, the dispensing date/time and the delivered date/time for respective ID's are added at appropriate timings depending on progresses of respective operations.

In the "ID" item, an ID assigned to image data of a prescription is stored. The ID is an example of identification information. The ID is generated for each piece of image data of prescription attached to the e-mails received by the MFP 200. In other words, the ID is generated for each prescription. In the "transmission source address" item, an e-mail address of a transmission source of each e-mail to which the image data of the prescription is attached. Therefore, when a plurality of pieces of image data are attached to one e-mail, the same e-mail address is registered in the "transmission source address" items for a plurality of different ID's. With this configuration, the image data of a plurality of prescriptions attached to one e-mail are associated with one e-mail address (i.e., the transmission source address). In the "attached data" item, a file name of the image data corresponding to the ID and a location (i.e., stored location) of the image data corresponding to the ID are stored.

In the "status" item, information indicating a progress of a processing is changeably stored. Specifically, the "status" item may be set to one of "acquired", "dispensing completed" or "delivered". The status "acquired" indicates that registration and printing of the prescription have been completed and the prescription has been acquired, but dispensing has not been completed, and therefore, a completion notification has not been transmitted. The status "dispensing completed" indicates that dispensing has been completed and a notification of completion of dispensing has been transmitted. The item "delivered" indicates that the dispensed medicine has been delivered. It is noted that the "acquired" item is an example of status information indicating a first status, the "dispensing completed" item is an example of status information indicating a second status, and the "delivered" item is an example of status information indicating a third status.

The "dispensed date/time" item indicates a date and time when the dispensing has completed. That is, in the "dispensed data/time", date and time when "dispensing completed" is set to the "status" item are stored. The "delivered data/time" item indicates date and time when the dispensed medicine has been delivered. That is, in the "delivered data/time" item, the date and time when "delivered" is set to the "status" item. It is noted that the information of date/time stored in the "dispensed date/time" item and the information of date/time stored in the "delivered date/time" are examples of date/time information.

It is noted that the network I/F 39 shown in FIG. 1 is hardware for communication with a device connected through a LAN cable. The MFP 200 is connected to a mail server 301 and an external device 500 through the network.

A barcode reader I/F 37 is hardware configured to control communication with a barcode reader 400. The barcode reader 400 is an example of an image reader. The barcode reader I/F 37 and the barcode reader 400 constitute an example of an image reader. The barcode reader I/F 37 and the barcode reader 400 may be connected through wires, or may be connected wirelessly. Further, the barcode reader 400 may be, for example, a pen reader, a CCD touch reader, a laser scanner, a two-dimensional barcode reader, or a stationary barcode reader.

Figure 3:
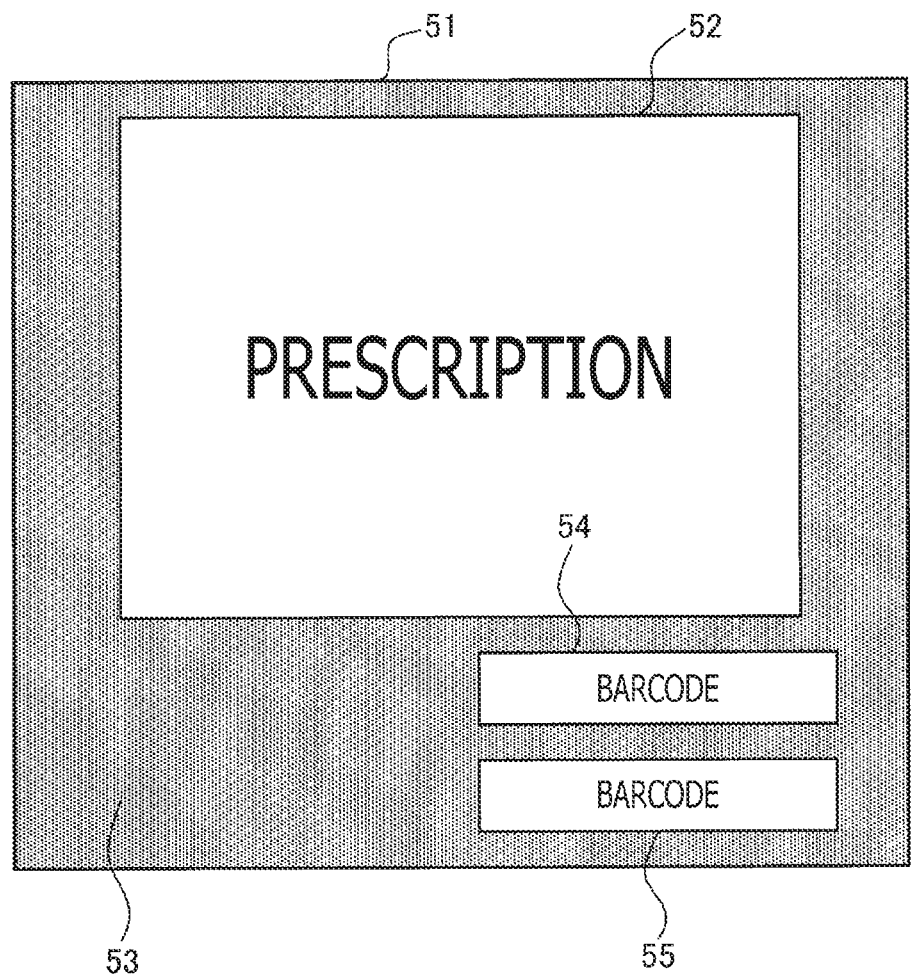

As shown, for example, in FIG. 3, on a sheet 51, an image 54 of a first barcode 54 and an image 55 of a second barcode are printed in addiction to an image 52 of a prescription. The image 54 of the first barcode and the image 55 of the second barcode are examples of a particular image. The image 54 of the first barcode is an example of a first particular image, while the image 55 of the second barcode is an example of a second particular image. The MFP 200 causes the barcode reader 400 to read the image 54 of the first barcode or the image 55 of the second barcode.

The image 54 of the first barcode includes ID and first status update information. The first status update information is information which instructs to change the "status" item of the acceptance information database 35 corresponding to the ID included in the image 54 of the first barcode to "dispensing completed".

The image 55 of the second barcode includes ID and second status update information. The second status update information is information which instructs to change the "status" item of the acceptance information database 35 corresponding to the ID included in the image 55 of the second barcode to "delivered".

The image 55 of the second barcode includes the ID which is the same as the ID included in the image 54 of the first barcode. However, the image 55 of the second barcode includes the second status update information which is different from the first status update information included in the image 54 of the first barcode. Therefore, the MFP 200 can read the image 54 of the first barcode and the image 55 of the second barcode in a distinguished manner because of the difference between the first status update information and the second status update information.

[General Description of Completion Notification]

Figure 4:
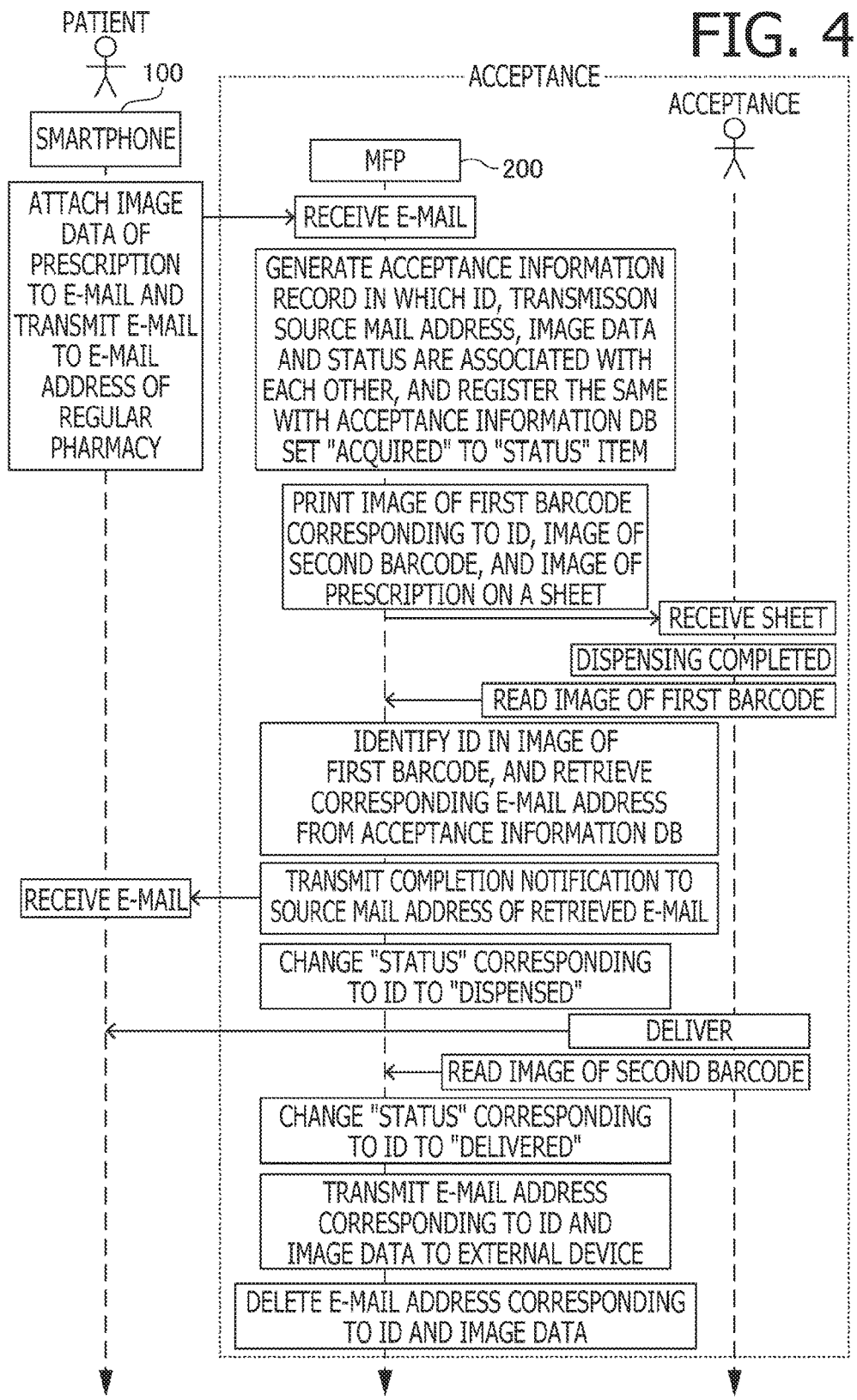
FIG. 4 is a sequence chart generally illustrates a notification process.

Next, referring to a sequence chart shown in FIG. 4, an operation of the MFP 200 to notify completion of dispensing will be described.

For example, the patient may capture an image of a prescription issued by a hospital with use of a camera function of the patient's smartphone 100, generate an e-mail message attaching image data representing the captured image of the prescription, and transmit the e-mail message to an e-mail address of the patient's regular pharmacy.

The MFP 200 installed in the pharmacy may be configured such that, in response to receipt of the e-mail attaching the image data, the MFP 200 creates acceptance information record in which the ID assigned to the image data, the e-mail address of the transmission source of the received e-mail, a file name and a storage location of the image data corresponding to the ID, and the status are associated with each other, and the record is automatically stored in the acceptance information database 35. At this stage, to the "status" item, a status of "acquired" is automatically set. Thus, it is not necessary for the patient to register the patient's e-mail address and the like with the MFP 200 in advance.

Thereafter, the MFP 200 prints the image 54 of the first barcode, the image 55 of the second barcode, the image 52 of the prescription, which correspond to the ID, on the sheet 51. A pharmacist then receives the sheet 51 printed by the MFP 200, and performs dispensing.

When the dispensing has completed, the pharmacist makes a barcode reader 400 read the image 54 of the first barcode printed on the sheet 51. Then, the MFP 200 identifies the ID in the image 54 of the first barcode, and retrieves the e-mail address corresponding to the identified ID from the acceptance information database 35. Thereafter, the MFP 200 transmits a completion notification notifying completion of the dispensing by e-mail with setting the retrieved e-mail address to a notification destination. As above, even if the e-mail address, which is the notification destination, is not input, the completion notification can be automatically transmitted to the smartphone 100 of the patient who had transmitted the image data of the prescription.

The MFP 200 that transmitted the completion notification automatically changes the content of the "status" item of the acceptance information database 35 corresponding to the ID to "dispensing completed" in accordance with the first status update information included in the image 54 of the first barcode.

When the completion notification is transmitted to the smartphone 100, the patient may go to the pharmacy and receive medicine. When the dispensed medicine is delivered to the patient, the pharmacist makes the barcode reader 400 read the image 55 of the second barcode printed on the sheet 51. Then, the MFP 200 automatically changes the "status" item of the acceptance information database 35 to "delivered" in accordance with the second status update information included in the image 55 of the second barcode. Since the MFP 200 automatically updates the "status" item, the pharmacy is not required to input such information in the "status" item, thereby troublesome operation being reduced.

Thereafter, the MFP 200 transmits the e-mail address and the image data corresponding to the ID to the external device 500. With this configuration, a work log of an operation can be stored in the external device 500. Thereafter, the MFP 200 deletes the e-mail address and the image data corresponding to the ID, thereby available capacity of the RAM 33 being secured.

[Completion Notification Transmission Process]

Next, a completion notification transmission process will be described, referring to the flowchart shown in FIGS. 5A-7. The completion notification transmission process is generally divided into a prescription acceptance process shown in FIGS. 5A and 5B, and a post-dispensing process shown in FIGS. 6 and 7. Therefore, in the following description, the prescription acceptance process is described firstly, and the post-dispensing process will be described thereafter.

[Prescription Acceptance Process]

Figure 5A:
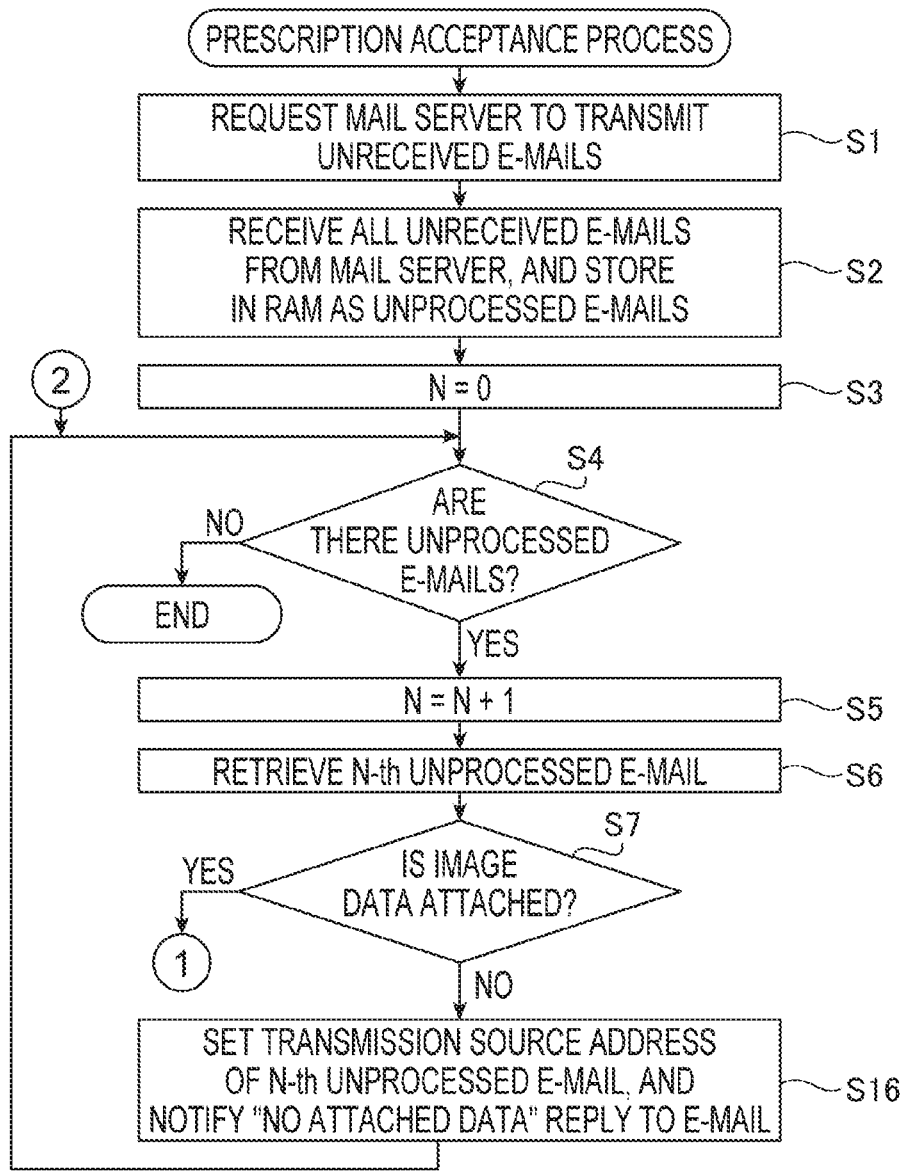
FIGS. 5A and 5B show a flowchart illustrating a prescription acceptance process according to the first embodiment.
Figure 5B:
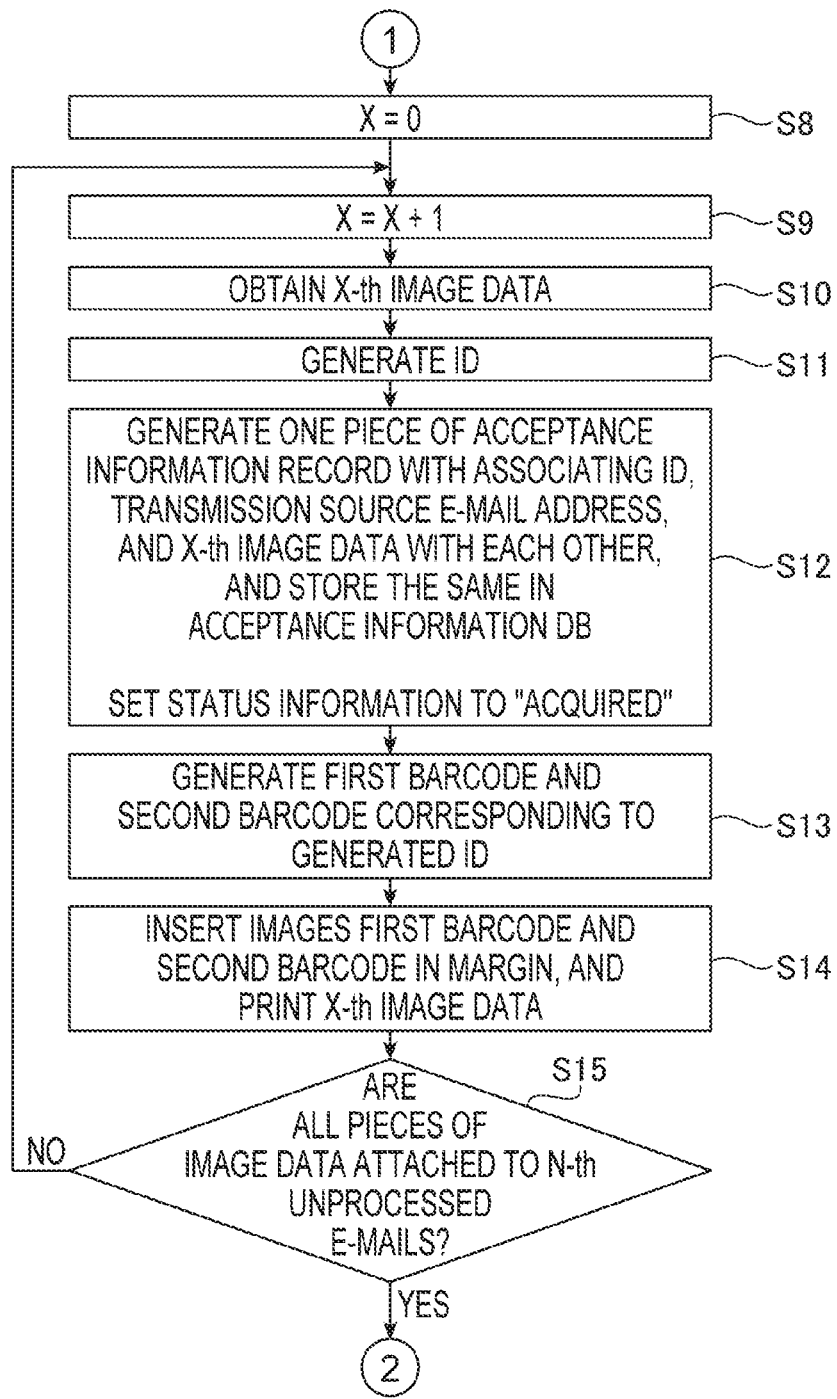

The prescription acceptance process shown in FIGS. 5A and 5B is periodically executed by the CPU 31. For example, the patient who receives a prescription from the hospital may photograph an image of the prescription with user of the camera function of the smartphone 100, attach the image data of the prescription to an e-mail message, and send the e-mail message to an e-mail address designated by a pharmacy. The e-mail is stored in the mail server 301 in which the MFP 200 is registered as a client. The CPU 31 controls the network I/F 39 to automatically connect with the mail server 301, and upon connection, the CPU 31 executes a process shown in FIGS. 5A and 5B.

The CPU 31 controls the network I/F 39 to request the mail server 31 to transmit unreceived e-mails addressed to the MFP 200 and stored in the mail server 301 to the MFP 200 (S1). It is noted that the process of S1 is an example of a first request transmission process. Then, the CPU 31 controls the network I/F 39 to receive all the unreceived e-mails addressed to the MFP 200 and stored in the mail server 301 from the mail server 301, and store the received e-mails in the RAM 33 as unprocessed e-mails (S2). It is noted that the process in S2 is an example of an e-mail reception process. The unprocessed e-mails are stored in the RAM 33 in a received order.

Thereafter, the CPU 31 sets "0" to an reception order N of the unprocessed e-mails (S3). Thereafter, the CPU 31 determines whether there exist unprocessed e-mails in the RAM 33 (S4). When it is determined that no unprocessed e-mails are stored in the RAM 33, the CPU 31 determines that there are no unprocessed e-mails (S4: NO), and the CPU 31 terminates the prescription acceptance process.

When one or more unprocessed e-mails are stored in the RAM 33, the CPU 31 determines that there are unprocessed e-mails (S4: YES). In this case, the CPU 31 add "1" to the reception order N to counts the order of the unprocessed e-mails (S5). Next, the CPU 31 retrieves the N-th unprocessed e-mail from the RAM 33 (S6).

Next, the CPU 31 determines whether image data is attached to the N-th unprocessed e-mail retrieved in S6 (S7). This determination is made since, when the prescription is acquired through the network, it is required that the prescription for dispensing should be attached to the e-mail.

When it is determined that image data is not attached to the N-th unprocessed e-mail retrieved in S6 (S7: NO), the CPU 31 requests the server 3-1 to transmit an e-mail notifying "no attached data" with setting the transmission source of the e-mail address retrieved in S6 to the destination address of the e-mail to be transmitted (S16). When such an e-mail is transmitted, the patient reads the notification through the patient's smartphone 100, realizes that the image data of the prescription had not been attached, and may transmit another e-mail attaching the image data of the prescription to the MFP 200.

When it is determined that image data is attached to the N-th unprocessed e-mail retrieved in S6 (S7: YES), the CPU 31 sets "0" to an attachment number X of the image data. There could be a case where a plurality of pieces image data respectively corresponding to a plurality of prescriptions are attached to the N-th unprocessed e-mail. Therefore, the CPU 31 initializes the attachment number X of the image data to "0" (S8). Thereafter, the CPU 31 adds "1" to the attachment number X of the image data, and counts the attachment number X of the image data (S9).

Next, the CPU 31 retrieves an X-th piece of image data attached to the N-th unprocessed e-mail from among the image data attached to the N-th unprocessed e-mail retrieved in S6 (S10). Thereafter, the CPU 31 generates ID corresponding to the X-th piece of image data obtained in S10 (S11). The process in S11 is an example of a generating process.

Next, the CPU 31 generates a record by associating the ID, the transmission source e-mail address, the X-th piece of image data and the status with each other as one acceptance information record, and store the record in the acceptance information database 35. At this stage, the CPU 31 sets the "status" item to "acquired" (S12). The process of S12 is an example of a storing process. The CPU 31 stored the ID generated in S11 in the "ID" item of the acceptance information database 35. Then, in the "destination address" item of the acceptance information record corresponding to the stored ID, the CPU 31 stores the transmission source e-mail address of the N-th unprocessed e-mail retrieved in S6. Further, in the "attached data" item of the acceptance information record corresponding to the ID, the CPU 31 stores the information regarding the file name and the location of the X-th piece of image data obtained in S10. Then, the CPU stores "acquired" in the "status" item of the acceptance information record corresponding to the ID.

Thereafter, the CPU 31 generates the image 54 of the first barcode and the image 55 of the second barcode corresponding to the ID generated in S11 (S13). Specifically, the CPU 31 generates the image 54 of the first barcode which includes the ID generated in S11 and the first status update information instructing to change the "status" item of the acceptance information database 35 to "dispensing completed". Further, the CPU 31 generates the image 55 of the second barcode which includes the ID generated in S11 and the first status update information instructing to change the "status" item of the acceptance information database 35 to "delivered".

Thereafter, the CPU 31 inserts the image 54 of the first barcode and the image 55 of the second barcode within the margin 53 of the sheet 51, and controls the printer 10 to print the image 52 of the image data of the prescription on the sheet 51 (S14). That is, the CPU 31 obtains information regarding the file name and location of the image data of the prescription from the "attached data" item corresponding to the ID, and the image data having the obtained file name from the obtained location. Then, the CPU 31 prints the image 54 of the first barcode and the image 55 of the second barcode generated in S13 on the sheet 51 together with the image 52 of the image data of the prescription.

After printing the image 52 of the image data of the prescription, the CPU 31 determines whether all the pieces of image data attached to the N-th unprocessed e-mail have been printed (S15).

When it is determined that all the pieces of the image data attached to the N-th unprocessed e-mail have not been printed (i.e., there exists one or more pieces of image data which has not been printed among the image data attached to the N-th unprocessed e-mail) (S15: NO), the CPU 31 returns to S9 and executes processes of S9-S15 for the image data which has not been printed.

It is assumed that the patient receives an internal medical checkup and receives a prescription A, and receives a surgery checkup and receives a prescription B. In such a case, the patient attaches image data AA of the prescription A and image data BB of the prescription B to an e-mail and send the e-mail to the MFP 200. In this case, the CPU 31 executes the processes of S9-S15 repeatedly to associate the image data AA and the image data BB with the same e-mail and stored the same in the acceptance information database 35.

That is, the CPU 31 generates ID regarding the image data AA of the prescription A attached to the N-th unprocessed e-mail, and generates the acceptance information record in which the generated ID is associated with the transmission source address of the N-th unprocessed e-mail and the image data AA, and stores the generated acceptance information record in the acceptance information database 35. Further, the CPU 31 generates ID regarding the image data BB, which is different from the ID regarding the image data AA, of the prescription B which is also attached to the N-th unprocessed e-mail, and generates another acceptance information record in which the generated ID is associated with the transmission source address of the N-th unprocessed e-mail and the image data BB, and stores the generated acceptance information record in the acceptance information database 35. According to the above configuration, as the transmission source address of the acceptance information record corresponding to the ID of the image data AA, and as the transmission source address of the acceptance information record corresponding to the ID of the image data BB, the same e-mail address is registered. Therefore, the MFP 200 can sent the completion notification notifying completion of the dispensing according to the prescription A, and the completion notification notifying completion of the dispensing according to the prescription B to the same e-mail address.

When it is determined that all the pieces of image data attached to the N-th unprocessed e-mail have been printed (there remains no image data which is attached to the N-th unprocessed e-mail and not printed) (S15: YES), the CPU 31 returns to S4, and determines whether there remains unprocessed e-mails for which the processes of S5-S15 has not been executed.

While the decision result in S4 is "YES", the CPU 31 repeats the process of S5-S15 and acquires the prescriptions attached to the unprocessed e-mails in accordance with the reception order N. When the decision result in S4 turns to "NO", the CPU 31 terminates the prescription acceptance process.

As described above, when the CPU 31 receives the e-mail attaching the image data of the prescription(s), the acceptance information such as e-mail addresses to be used as destination addresses of the completion notification(s), information regarding the image data of the prescription(s) are automatically registered with the acceptance information database 35. Therefore, time and effort for manually registering such information can be suppressed. Further, since the CPU 31 automatically prints the images 52 of the image data of the prescriptions attached to the e-mails on the sheet 51 for each of the e-mails, omission of printing of the image data of the prescriptions can be avoided. Further, time and effort required to print the image data of the prescriptions can be reduced.

[Post-Dispensing Process]

Figure 6:
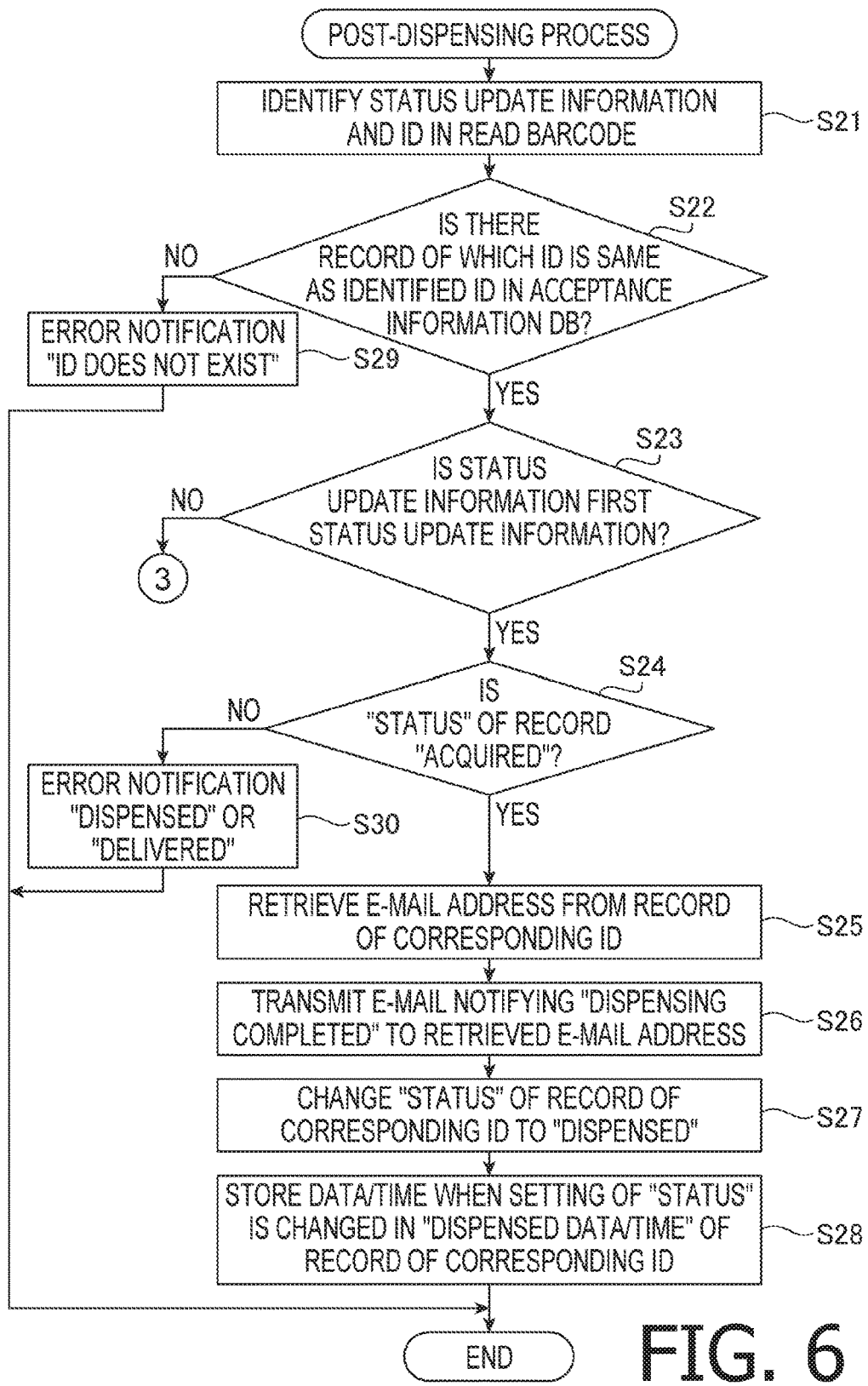
FIGS. 6 and 7 show a flowchart illustrating post-dispensing process.

The post-dispensing process shown in FIG. 6 is executed by the CPU 31 in response to the user causing the barcode reader 400 to read a barcode. The sheet 51 is attached to the medicine after the image of the prescription is printed and till the medicine is delivered. For example, when the pharmacist completes dispensing in accordance with the prescription printed on the sheet 51, the medicine and the sheet 51 may be placed on the same tray until the medicine is delivered, or the sheet 51 is attached to a paper bag in which the medicine is put with a rubber band or stabled. As above, in response to the user causing the barcode reader 400 to read the image 54 of the first barcode or the image 55 of the second barcode printed on the sheet 51 attached to the medicine, the CPU 31 starts executing the post-dispensing process shown in FIG. 6.

The CPU 31 controls the barcode reader I/F 37 to identify the status update information and the ID from the barcode read by the barcode reader 400 (S21). The process of S21 is an example of an identifying process.

Then, the CPU 31 determines whether there exists the acceptance information record for the ID which is the same ID as identified in S21 in the acceptance information database 35 (S22). That is, the CPU 31 collates the ID identified in S21 with the ID's registered in the acceptance information database 35 to determine whether there is a record referring to the same ID in the acceptance information database 35.

When it is determined that there is no acceptance information record for the ID same as the ID identified in S21 in the acceptance information database 35 (S22: NO), the CPU 31 displays an error message "ID does not exist" on the LCD 42. When, for example, the patient directly brings the prescription to the pharmacy, no ID is registered in the acceptance information database 35. In such a case, the error notification is made as described above, the pharmacist can recognize that it is unnecessary to transmit the completion notification.

In contrast, when it is determined that there is an acceptance information record for the ID same as the ID identified in S21 in the acceptance information database 35 (S22: YES), the CPU 31 further determines whether the status update information identified in S21 is the first status update information or not (S23). That is, the CPU 31 determines whether the barcode reader 400 read the image 54 of the first barcode or the image 55 of the second barcode.

When it is determined that the status update information identified in S21 is the first status update information (S23: YES), the CPU 31 determines whether "acquired" is set to the "status" item of the acceptance information record corresponding to the ID identified in S21 (S24).

When "acquired" is set to the "status" item of the acceptance information record corresponding to the ID identified in S21 (S24: YES), the completion notification has not yet been transmitted. Therefore, the CPU 31 retrieves the e-mail address from the acceptance information record corresponding to the ID (S25). The process of S25 is an example of an address retrieval process. As above, the CPU 31 obtains the e-mail address from the "transmission source address" item of the acceptance information record for the ID same as the ID identified in S21.

Next, the CPU 31 controls the network I/F 39 to set the e-mail address retrieved in S25 to the transmission destination, and transmit an e-mail notifying "completion of dispensing" (S26). The process of S26 is an example of a second request transmission process. That is, the CPU 31 controls the network I/F 39 to request the mail server 301 to transmit the completion notification to the e-mail address retrieved in S25. The completion notification may contains a comment such as "Dispensing has completed. Please come and receive the medicine." The mail server 301 transmits the completion notification by an e-mail in accordance with the request by the MFP 200 to the smartphone 100 of which e-mail address is retrieved in S25.

After the completion notification is transmitted, the CPU 31 changes the "status" item of the acceptance information record corresponding to the ID identified in S21 from "acquired" to "dispensing completed" (S27). The process of S27 is an example of a changing process. With the above process, regarding the medicine corresponding to this prescription, the CPU 31 can recognize whether the completion notification has been transmitted and delivery of the medicine is being waited.

After changing the "status" item to the "dispensing completed", the CPU 31 stores date and time when the "status" item of the acceptance information record corresponding to the ID identified in S21 is set from "acquired" to "dispensing completed" (S28). That is, the CPU 31 detects the date/time when the "status" item is changed from the "acquired" to "dispensing completed" in S27, and adds the detected date/time to the dispensed date/time" item of the acceptance information record. With the above process, a log of an operation to transmit the completion notification (i.e., the log indicating completion of the dispensing) is registered with the acceptance information database 35 in a detailed manner. Thereafter, the CPU 31 terminates the post-dispensing process.

Thus, the pharmacist, who has completed dispensing, may cause the barcode reader 400 to read the image 54 of the first barcode printed on the sheet 51 on which the prescription used for the dispensing is printed, it is possible the make the MFP 200 transmit the completion notification without inputting the e-mail address. Since transmission of the completion notification, changing of the status information indicative of an operation status regarding the dispensing, and registration of the date/time of dispensing are automatically performed. That is, the time and elaboration to manually input the above items can be suppressed.

When "acquired" is not set to the "status" item (S24: NO), the CPU 31 terminates the post-dispensing process after controlling the LCD 42 to display the error message. That is, in this case, the CPU 31 does not execute the process of retrieving the e-mail address which is the transmission destination of the completion notification (S25), the process of transmitting the completion notification (S26) or the process of changing the status information (S27) since the CPU 31 has already completed transmission of the completion notification.

For example, if "dispensing completed" is set to the "status" item (S24: NO), the CPU 31 makes the error notification (S30) by indicating that "dispensing completed" is set to the "status" item. The error notification may include a comment indicating that the completion notification has been transmitted. With the above configuration, the pharmacist, who notices the error notification, recognizes that the patient to whom the completion notification has been transmitted may not realize the completion notification or has not arrived to receive the medicine due to some reasons. Further, by checking the dispensing date/time, the pharmacy can know how long the patient has not come to receive the medicine. When the situation is known, the pharmacist may, for example, re-transmit the completion notification, or notify the patient of the completion of dispensing by means of another method (e.g. telephone call) to encourage the patient to come and receive the medicine.

When "delivered" is set to the "status" item (S24: NO), the CPU 31 makes the error notification (S30) by indicating that "delivered" is set to the "status" item. With this configuration, the pharmacist, who notices the error notification, recognizes that the patient has already received the medicine. Accordingly, it is possible to avoid that the pharmacist unnecessarily retransmit the completion notification, or unnecessarily make a telephone call to the patient to encourage receipt of the medicine.

When the status update information identified in S21 is not the first status update information (S23: NO), the CPU 31 proceeds to S31. For example, when the barcode reader 400 reads the image 55 of the second barcode, the status update information identified in S21 is the second status update information, but not the first status update information. In such a case, the CPU 31 determines, in S31 of FIG. 7, whether "dispensing completed" is set to the "status" item of the acceptance information record corresponding to the ID identified in S21.

When it is determined that "dispensing completed" is set to the "status" item of the acceptance information record (S31: YES), the completion notification has been transmitted but the medicine has not yet been delivered. Therefore, the CPU 31 changes the "status" item of the acceptance information record having the ID same as the ID identified in S21 from "dispensing completed" to "delivered" (S32). With the above configuration, the CPU 31 does not execute the process of retrieving the e-mail address used as the transmission destination of the completion notification (S32), the process of transmitting the completion notification (S26), or the process of changing the "status" item of the acceptance information record to "dispensing completed" (S27). That is, the CPU 31 does not unnecessarily transmit the completion notification. Further, regarding the medicine corresponding to the prescription, it becomes possible that the CPU 31 recognizes the medicine has been delivered.

After changing the "status" item to "delivered", the CPU 31 stores the date/time when the setting of the "status" item is changed to the "delivered date/time" item of the acceptance information record corresponding to the ID identified in S21 (S33). That is, the CPU 31 detects the date/time when the "status" item is changed to "delivered" in S32, and registers the detected date/time with the "delivered date/time" item of the acceptance information record. With this configuration, the log of the operation in which the delivery has been completed is recorded in the acceptance information database 35 in a detailed manner.

As the pharmacist simply causes the barcode reader 400 to read the image 55 of the second barcode printed on the sheet 51 of the prescription attached to the medicine, when the medicine is delivered to the patient, change of the status information, registration of the delivered date/time are automatically executed, and time and elaboration for manually input such information can be suppressed.

After storing the date/time information in the "delivered date/time" item of the acceptance information record, the CPU 31 retrieves the e-mail address corresponding to the ID identified in S21, and the file name and the location of the file of the image data of the prescription corresponding to the ID from the acceptance information database 35. Then, the CPU 31 controls the network I/F 39 to transmit the retrieved e-mail address, and the image data having a file name which is same as the retrieved file name and stored in the retrieved location to the external device 500 (S34).

After transmitting particular data to the external device 500, the CPU 31 delete the e-mail address corresponding to the ID identified in S21, and the image data of the prescription corresponding to the same ID (S35). The process in S35 is an example of a deleting process. That is, the CPU 31 deletes the e-mail address associated with the ID identified in S21 and information regarding the file name and the stored location of the image data of the prescription from the acceptance information database 35. Further, the CPU 31 deletes corresponding image data subject to deletion from the stored location thereof.

By deleting the image data of the prescription which has been delivered from the acceptance information database 35 and the stored location, the available capacity of the RAM 33 for storing image data of newly accepted prescription can be secured. Further, before deleting the image data, the e-mail address and image data of the prescription subject to deletion are transmitted to the external device 500 and stored therein. Therefore, both the e-mail address and the image data of the prescription having been delivered can be retained in the external device 500 as a record of the service.

When "dispensing completed" is not set to the "status" item (S31: NO), the CPU 31 controls the LCD 42 to make the error notification (S36), and terminate the post-dispensing process.

For example, when the "acquired" is set to the "status" item (S31: NO), the CPU 31 makes an error notification indicating the "acquired" is set to the "status" item (S36). Then, the pharmacist seeing the error notification realizes that the patient has visited the pharmacy to receive the medicine before the patient receive the completion notification. Then, the pharmacist may operate the button group 41 to perform an operation to delete the acceptance information record corresponding to the ID identified in S21, and an operation to change the "status" item to "delivered". With this operation, it becomes avoidable to transmit the completion notification to the patient who has already received the medicine.

When, for example, "delivered" is set to the "status" item, the CPU 31 makes an error notification indicating that "delivered" is set to the "status" item. Then, the pharmacist seeing the error notification may realize that a person different from a person who visits to receive the medicine, for example, when the patient has come to the pharmacy, a family member of the patient has already received the medicine, and tell the patient that the member of the patient's family has received the medicine.

In this case, for example, the CPU 31 may be configured to delete the acceptance information record in which the "delivered date/time" item is set to date/time seven days before or older. If seven days or more have passed after an acceptance information record has delivered and the "delivered date/time" were recorded, it is not likely that such an acceptance information record will be referred to again. Therefore, such a relatively old acceptance information record may be deleted from the acceptance information database 35 periodically. Such a configuration is preferable since the available capacity of the RAM 33 for storing newly acquired image data of the prescription can be secured.

As described above, when the e-mail attaching at least one piece of image data of prescription, the MFP 200 automatically stores, for each piece of image data, the ID, the transmission source address of the e-mail, and the attached piece of image data, in an associated manner, in the acceptance information database 35. Then, the MFP 200 transmits the completion notification to the e-mail address stored in the acceptance information database 35. According to the above configuration, it is unnecessary to preliminarily register transmission destination information such as the e-mail address to the MFP 200. Thus, the patient is not required for the time and effort for preliminarily registering such information. The MFP 200 print the image 54 of the first barcode and the image 55 of the second barcode on the sheet 51 on which the image 52 of the prescription attached to the e-mail is printed. Thereafter, when the image 54 of the first barcode on the sheet 51 is read by the barcode reader 400, the MFP 200 identifies the ID from the image 54 of the first barcode, and determines the e-mail address corresponding to the identified ID as the transmission destination. According to the above configuration, an input error when transmission destination information is input may hardly occur.

Second Embodiment

Next, the MFP 200 according to a second embodiment according to the disclosures will be described.

It is noted that a hardware configuration of the MFP 200 according to the second embodiment is the same as that of the first embodiment. Only a control procedure of the second embodiment is different from that of the first embodiment. The MFP 200 according to the second embodiment prints, in a margin 53 of the sheet 51 on which the image 52 of the image data of the prescription is printed, one image 61 of a checkbox and one image 62 of a barcode. According to the second embodiment, the MFP 200 reads the checkbox 61 differently depending on whether a check 63 is included in the image 61 of the checkbox. Except the above point, the controlling procedure of the second embodiment is the same as that of the first embodiment. Therefore, in the following description, processes different from those of the first embodiment will mainly described, while processes and the hardware configuration similar to those of the first embodiment will be assigned with the same step/reference numbers, and description thereof will be omitted where appropriate. It is noted that, according to the second embodiment, the scanner 11 is an example of the image reader.

Figure 9A:
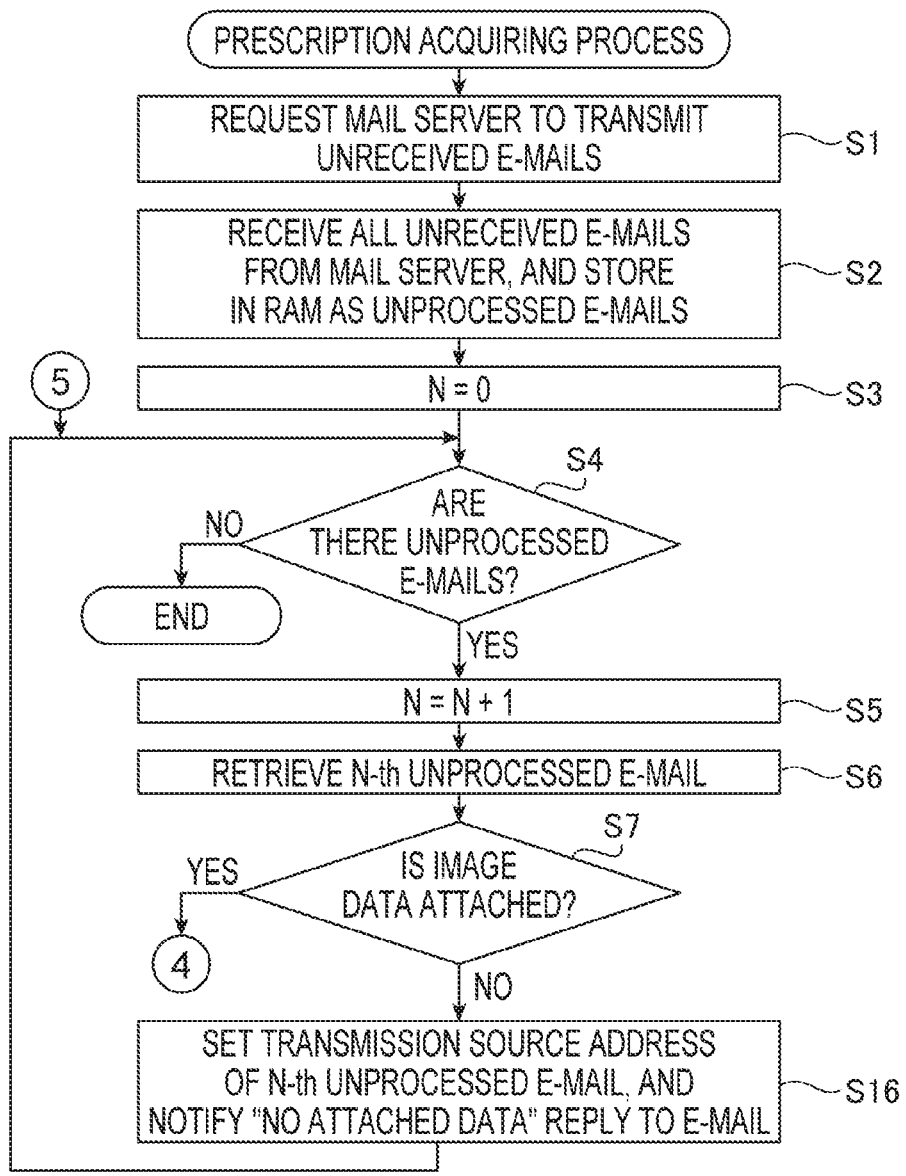
FIGS. 9A and 9B show a flowchart illustrating the prescription acceptance process according to a second embodiment of the present disclosures.
Figure 9B:
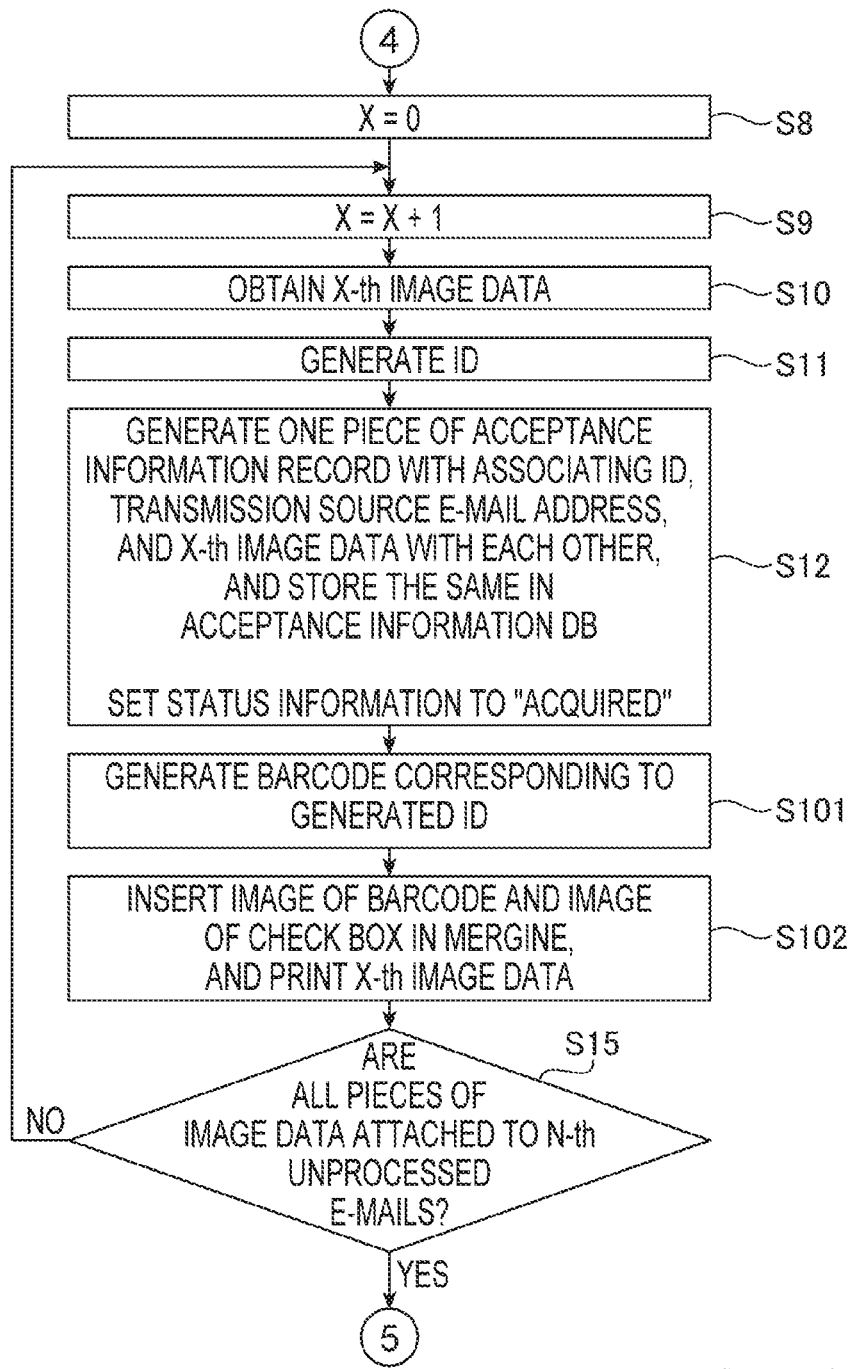

As shown in FIGS. 9A and 9B, the CPU 31 stores the particular acceptance information record in the acceptance information database 35 (S1-S12) as in the first embodiment, and generate a barcode including the ID generated in S11 (S101). According to the present embodiment, the CPU 31 generates only one barcode. Then, the CPU 31 inserts image 62 of the barcode generated in S101, and image 61 of the checkbox within the margin 53 of the sheet 51, and print the same together with the X-th image data attached to the N-th unprocessed e-mail (S102). The image 61 of the checkbox and the image 62 of the barcode are examples of a particular image. Further, the image 62 of the barcode is an example of an identification information. Further, the image 61 of the checkbox is an example of a frame image. The process in S102 is an example of an image forming process.

The CPU 31 repeatedly executes S5-S12, S101, S102 and S15, and for the unprocessed e-mails stored in the RAM 33 in S2, registration of the acceptance information and printing of the image data of the prescription (S15: YES), the terminates the prescription acceptance process.

When dispensing has been completed, the pharmacist does not write anything on the image 61 of the checkbox, and reads the sheet 51 on which the image 52 of the image data of the prescription with the scanner 11. The CPU 31 controls the scanner 11 to execute the post-dispensing process shown in FIG. 10 in response to reading the image 61 of the checkbox and the image 62 of the barcode.

The CPU 31 identifies the ID from the image 62 of the read barcode. Further, the CPU 31 identifies the status update information from the image 61 of the reach checkbox (S111). That is, the CPU 31 identifies an image within an area surrounded by a frame of the image 61 of the checkbox. The process of S111 is an example of the identifying process.

When it is determined that the acceptance information record having the ID same as the ID identified in S21 is included in the acceptance information database 35 (S22: YES), the CPU 31 determines whether there is a check mark 63 on the image 61 of the checkbox (S112). That is, the CPU 31 determines whether the image within the area surrounded by the frame of the image 61 of the checkbox is the same as the image within the area surrounded by the frame of the image 61 printed on the sheet 51 printed in S102 of FIGS. 9A and 9B.

When it is determined that the image within the area surrounded by the frame of the image 61 of the checkbox is the same as the image within the area surrounded by the frame of the image 61 of the checkbox printed on the sheet 51 in S102 of FIG. 9B, it is determined that there is no check mark 63 in the image 61 of the checkbox (S112: NO). That is, the CPU 31 determines that the status update information identified in S111 is first status update information. In such a case, the CPU 31 executes the process of S4 onwards to execute transmission of the completion notification. The process in S24 onwards are the same as those in the first embodiment, and description thereof will be omitted.

When it is determined that the image within the area surrounded by the frame of the image 61 of the checkbox is not the same as the image within the area surrounded by the frame of the image 61 of the checkbox printed on the sheet 51 in S102 of FIG. 9B, it is determined that there is the check mark 63 on the image 61 of the checkbox (S112: YES). That is, the CPU 31 determines that the status update information identified in S111 is not the first status update information. In this case, the CPU 31 does not execute the process of retrieving the e-mail address corresponding to the ID identified in S111 (S25), the process of transmitting the completion notification (S26), or the process of changing the setting of the "status" item (S27), but executes the process in S31 onwards. The process in S31 onwards is the same as that in the first embodiment, and description thereof will be omitted.

According to the above configuration, as in the first embodiment, it is unnecessary for the patient to preliminarily register the e-mail address which is the transmission destination of the completion notification. Then, the MFP 200 prints the image 62 of the barcode corresponding to the ID and the image 52 of the image data of the prescription attached to the e-mail on the same sheet 51. Thereafter, the MFP 200 controls the scanner 11 to read the image 62 of the barcode, identify the ID from the image 62 of the barcode, retrieve the e-mail address corresponding to the identified ID from the acceptance information database 35, and transmit the completion notification to the retrieved e-mail address.

Further, for example, when the medicine is to be delivered, and the pharmacist causes the scanner 11 to read the scanner 11 after the pharmacist writes the check mark 63 on the image 61 of the checkbox, the CPU 31 does not transmit the completion notification since the status update information is not the first status update information. In this case, the CPU 31 changes the "status" item to "delivered". Therefore, it is possible to avoid that the completion notification is transmitted to the patient who has already received the medicine.

Third Embodiment

Next, the MFP 200 according to a third embodiment will be described with reference to the drawings.

According to the third embodiment, the image 52 of the image data of the prescription attached to the e-mail is manually printed. The other configuration is the same as in the first embodiment. Therefore, in the following description, portions different from the first embodiment will be mainly described, and portions same as those of the first embodiment will be assigned with the same reference/step numbers, and description thereof will be omitted.

As shown in FIG. 13, according to the present embodiment, the acceptance information database 35 is configured such that the "status" item can be set to "registered" in addition to "acquired", "dispensing completed" or "delivered" so as to be updated. According to the present embodiment, "registered" is an example of the status information indicating a fourth status. "Acquired" is an example of the status information indicating the first status. "Delivered" is an example of the status information indicating the third status. "Dispensing completed" is an example of the status information indicating the second status. "Registered" indicates that registration of the prescription has been completed but printing has not been completed, and thus acceptance of the prescription has not been completed. Incidentally, "registered", "dispensing completed" and "delivered" are the same pieces of the information as in the first embodiment.

Figure 11A:
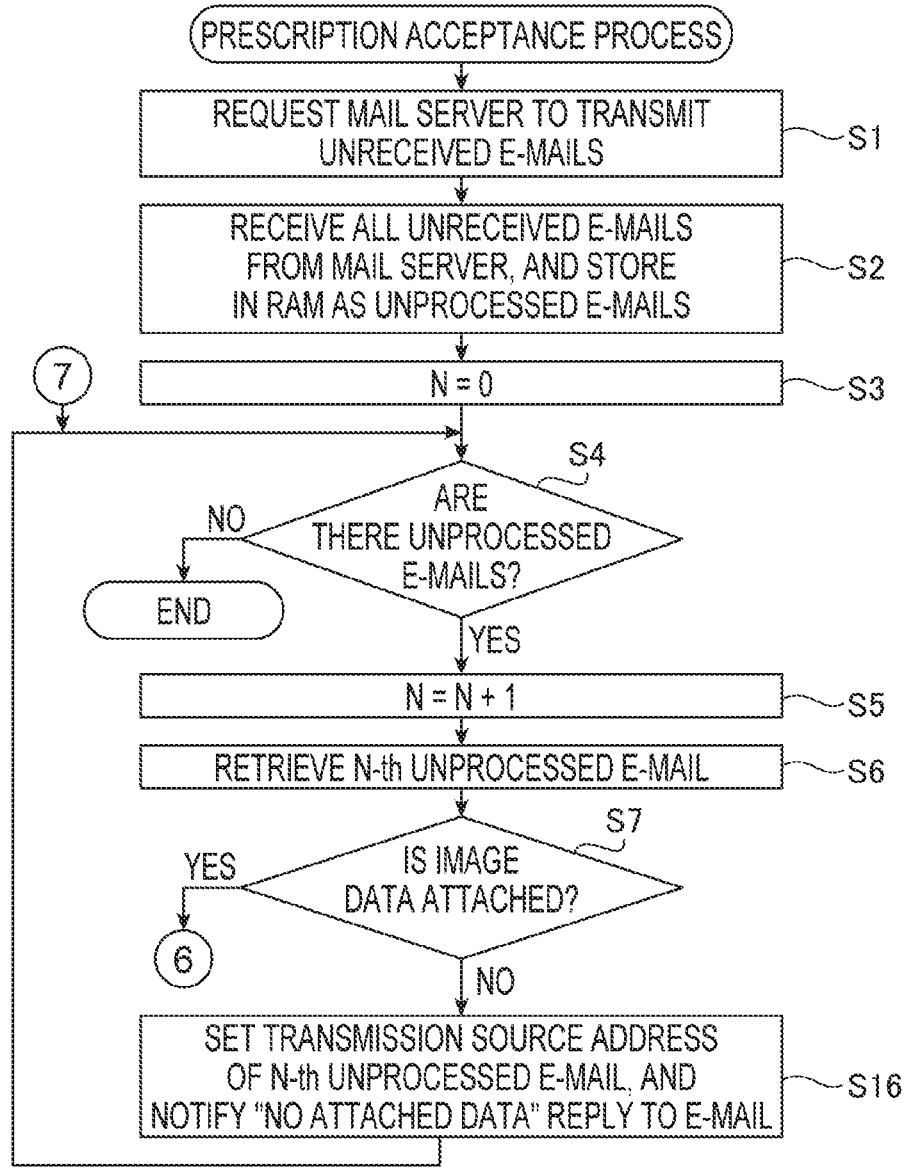
FIGS. 11A and 11B show a flowchart illustrating the prescription acceptance process according to a third embodiment of the present disclosures.
Figure 11B:
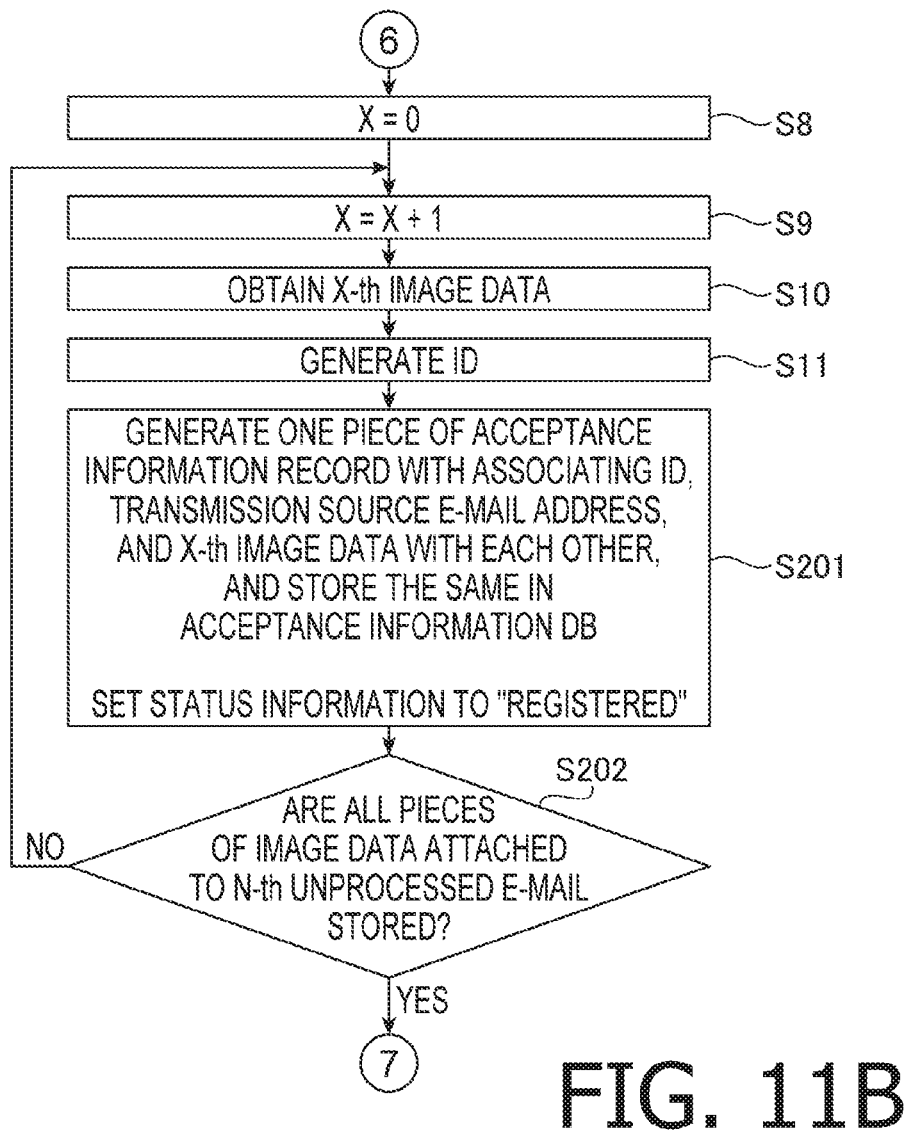

The prescription acceptance process shown in FIGS. 11A and 11B is periodically executed by the CPU 31, as in the first embodiment. According to the present embodiment, the CPU 31 retrieves one unprocessed e-mail stored in the RAM 33 (S2) and generates ID corresponding to the image data attached to the unprocessed e-mail as retrieved (S1-S11).

Thereafter, the CPU 31 generates the acceptance information record with associating with associating the e-mail address used as the transmission destination of the e-mail and the image data corresponding to the ID with the generated ID, and registers the generated record with the acceptance information database 35 (S1-S11, S201). In the process in S201, in the "status" item of the acceptance information record, "registered" is stored. The process of S201 is an example of the storing process. With this configuration, the CPU 31 can recognize that, regarding the prescription, registration has been completed but printing has not completed.

Thereafter, the CPU 31 determines whether all the pieces of image data attached to the N-th unprocessed e-mail have been registered with the acceptance information database 35 (S202). For example, when a plurality of pieces of image data are attached to the N-th unprocessed e-mail, until the CPU 31 generates ID's and acceptance information records for all the pieces of image data and stores the same in the acceptance information database 35 (S202: NO), the CPU 31 repeats the process of S9-S11, S201 and S202. When it is determined that all the pieces of image data attached to the N-th unprocessed e-mail have been stored (S202: YES), the CPU 31 returns to S4, and determines whether there remains, in the RAM 33, an unprocessed e-mail for which the process of S5-S11, S201 and S202 has not yet been executed.

While the result of determination in S4 is "YES", the CPU 31 registers the image data of the prescriptions attached to the unprocessed e-mails stored in the RAM 33 to the acceptance information database 35, without printing the same, by repeatedly executing the process of S5-S11 and S201. When the result of determination in S4 becomes "NO", the CPU 31 terminates the prescription acceptance process.

Figure 12:
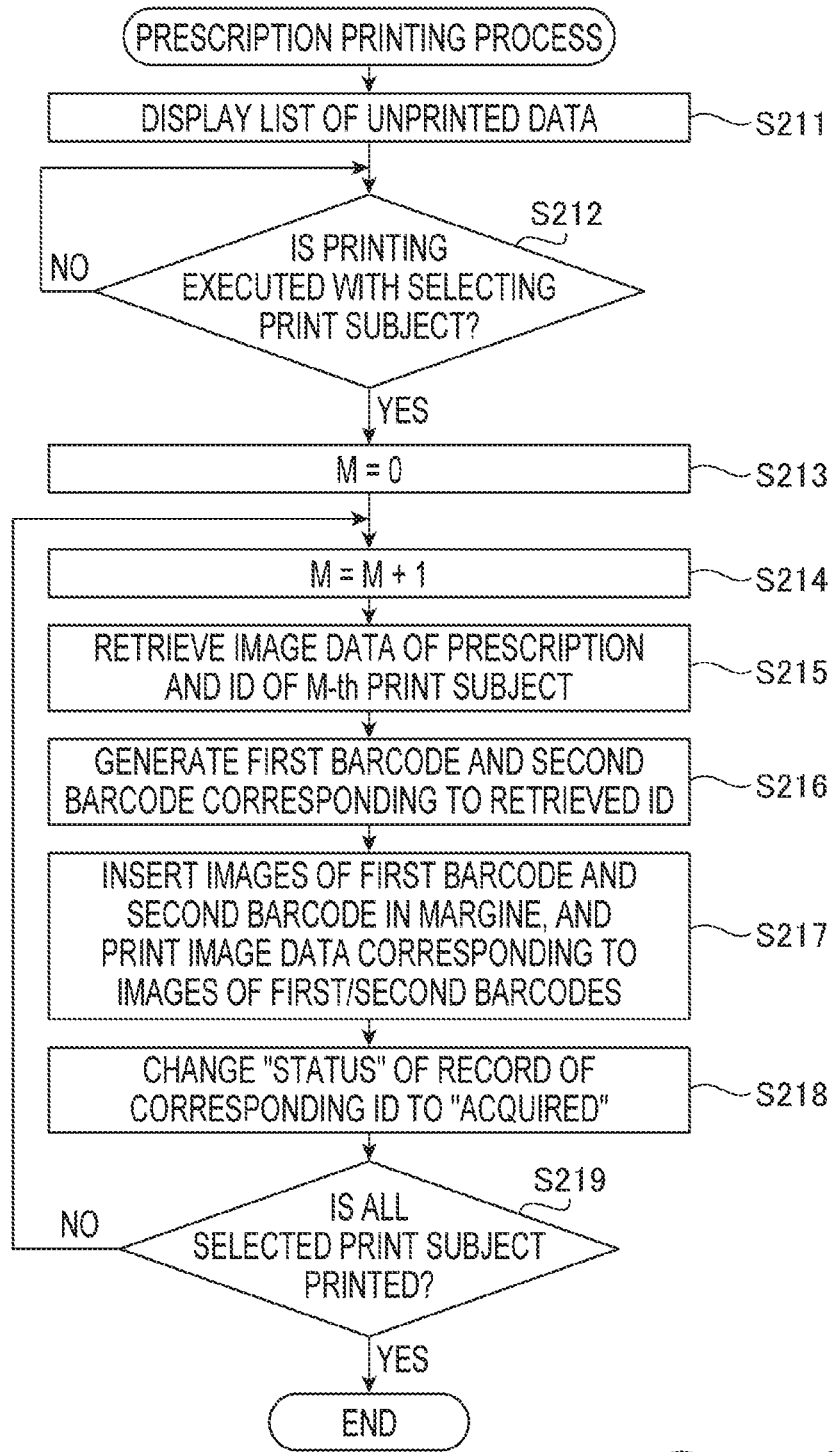
FIG. 12 is a flowchart illustrating a prescription printing process according to the third embodiment.

Printing of the image data of prescription is executed as the CPU 31 executes the prescription printing process shown in FIG. 12. The prescription printing process is executed in response to the button group 41 being operated for input and the CPU 31 receives user's selection of a job to print the prescription. Thus, printing of the image of the prescription is executed at a different timing from the registration of the acceptance information regarding the prescription.

When the job to print the prescription is received, the CPU 31 controls the LCD 42 to display a list of unprinted data of prescriptions (S211). The list of unprinted data of prescriptions is generated by identifying image data of which "status" item is "registered" from among the plurality of pieces of image data of prescriptions registered with the acceptance information database 35, and showing the identified data together with corresponding ID's. When the list of the unprinted data of prescriptions is displayed, printing objet selection boxes are indicated for respective unprinted prescriptions so that the user can arbitrarily select the prescriptions to be printed.

Next, the CPU 31 determines whether the printing objects are selected (i.e., one or more printing object selection boxes are checked) and a print execution command is input (S212). Until the printing objects are selected and the print execution command is input (S212: NO), the CPU 31 stands by at S212.

When the pharmacist presses a selection button to arbitrarily selects the printing object selection boxes displayed on the LCD 42 in S211, and presses an OK button of the button group 41, the CPU 31 acquires the print command to print the selected objects. That is, upon such an operation, the CPU 31 determines that the prescriptions to be printed are selected and the print command has been input (S212: YES). It is noted that selection of the prescriptions to be printed may be done by collectively select all the selection boxes at a time, or the selection boxes may be arbitrarily selected one by one. When the selection boxes are selected one by one, the CPU 31 firstly sets a number M of printing objects to "0" (S213). Thereafter, the CPU 31 adds "1" to the number M upon every selection of the selection boxes to count the number of the prescriptions to be printed (S214).

Thereafter, the CPU 31 retrieves the image data of the prescription which is an M-th printing object and the ID (S215). The process of S215 is an example of a printing object retrieving process. That is, the CPU 31 retrieves the ID from the "ID" item of the acceptance information record corresponding to the M-th printing object. Further, the CPU 31 retrieves the file name of the image data of the prescription and the stored location thereof from the "attached data" item of the acceptance information record, and retrieves the image data of the prescription from the stored location.

Next, the CPU 31 generates the first barcode and the second barcode corresponding to the ID retrieved in S215 (S216). Thereafter, the CPU 31 inserts the image 54 of the first barcode and the image 55 of the second barcode generated in S203 within the margin 53 of the sheet 51, controls the printer 10 to print the image 54 of the first barcode, the image 55 of the second barcode, and the image 52 of the image data of the prescription corresponding to the ID retrieved in S215 on the same sheet 51 (S217). The process of S217 is an example of the image forming process.

It is noted that the process in S216 and S217 is the same as the process in S13 and S14 shown in FIGS. 5A and 5B.

Thereafter, for the acceptance information record of which ID corresponds to the image data having been printed, the CPU 31 changes the "status" item to "delivered" (S218). The process of S218 is an example of a first changing process. With this process, the CPU 31 can recognize, regarding the prescription currently processed, registration and printing have been completed, and the prescription has been acquired by the pharmacy.

After the prescription is printed and the "status" item has been changed, the CPU 31 determines whether all the printing objects selected in S212 have been printed (S219). When it is determined that all the printing objects as selected have not been printed (S219: NO), the CPU 31 returns to S214, and processes the next printing object. As above, when all the selected printing objects have been printed by repeating the process of S214-S219 (S219: YES), the CPU 31 terminates the prescription printing process.

Figure 7:
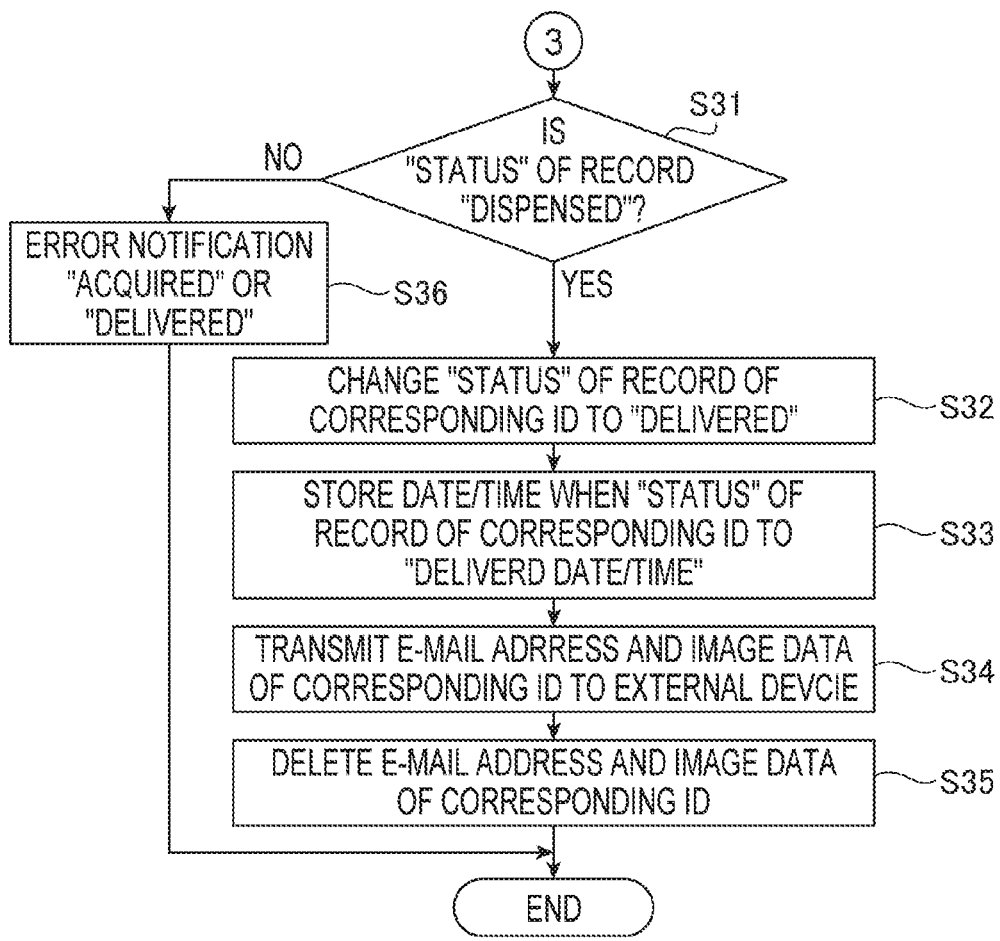
Figure 8:
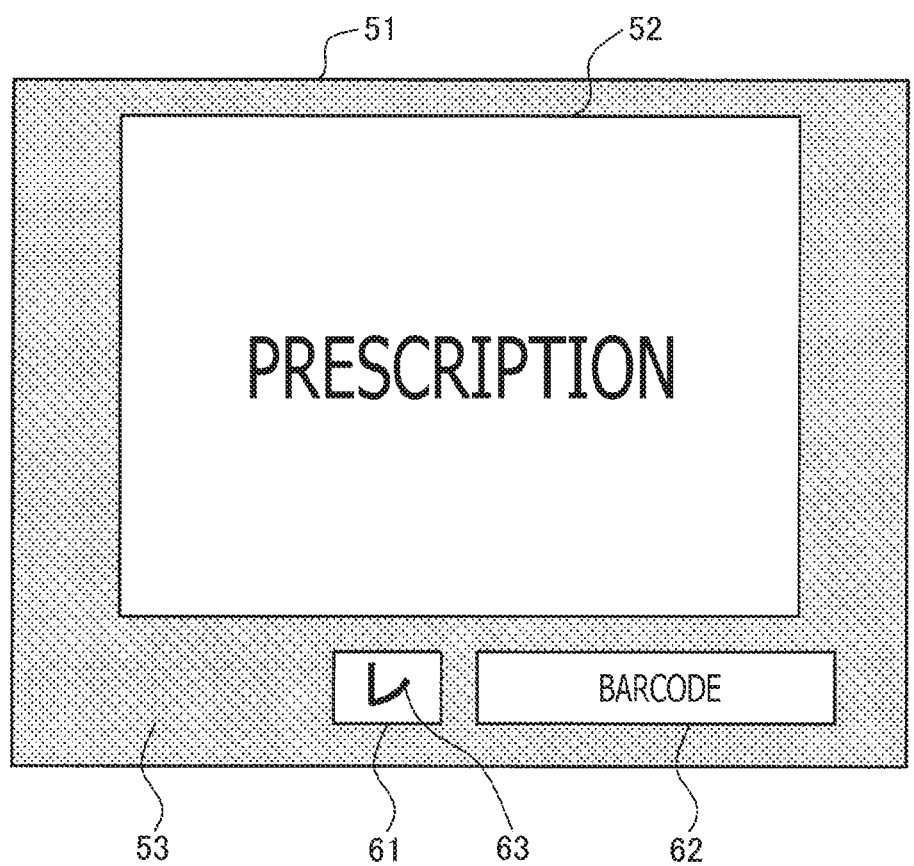
FIG. 8 shows an example of a prescription which is printed by an image forming apparatus according to a second embodiment of the present disclosures.

In the present embodiment, after dispensing is done, a process same as the post-dispensing process described in the first embodiment sections with reference to FIGS. 6 and 7 is executed. In this case, the process in S27 of FIG. 6 is an example of the second changing process.

According to the third embodiment, the image data of the prescription attached to the e-mail is manually printed on an e-mail basis. Therefore, the image 52 of the image data of the prescription can be printed on the sheet 51 at an arbitrary timing, and it is possible to suppress the sheet 51 from missing. There could be a case, for example, where a patient transmits an e-mail attaching the image data of the prescription to the MFP 200 during non-business ours (e.g., at night and/or during year-end/New Year holydays). In such a case, according to the third embodiment, the MFP 200 only execute a process of registering the ID corresponding to the e-mail, the transmission source address of the e-mail, information regarding the image data attached to the e-mail, and the status information in the acceptance information database 35. After the holydays, the pharmacist may operates the button group 41 of the MFP 200 to select the printing objects and input the print execution command to the MFP 200, the MFP 200 prints the image 54 of the first barcode including the ID of the printing object, the image 55 of the second barcode and the image 52 of the image data of the prescription subject to printing on the sheet 51. According to this configuration, the sheet 51 is printed under recognition of the pharmacist, and may hardly be lost.

It is noted that the above-described embodiments are merely examples according to the aspects of the present disclosures and are not intended to limit the aspects of the disclosures. Therefore, the aspects of the present disclosures may be modified in various ways without departing from the aspects of the disclosures. For example, the aspects of the present disclosures may be applied to a printer or copier provided with a communication device in addition to the MFP 200.

It is noted that the particular image printed on the sheet 51 may be, besides the image of the barcode, another image representing identification information or other information. In such a case, a scanner 11 having an OCR function may be used to analyze the characters to specify the identification information. Alternatively or optionally, the particular image may be a QR Code®, a color code, or encrypted image. In such a case, the identification information by be specified with use of a reader for decryption.

The above configuration may be modified such that, instead of the "dispensing date/time" item and the "delivered date/time" item of the acceptance information database 35, an item storing date/time when the "status" item is changed may be provided, and the existing "date/time information" may be changed to the date and time when the "status" item is modified. For example, when the date and time of dispensing are stored in the "date/time information" item, and the setting of the "status" item is changed from "dispensing completed" to "delivered", the "date/time information" item representing the "dispensing date/time" may be replaced with the "delivered date/time" which is new date/time information.

The MFP 200 may be configured such that, when the button group 41 is operated and a command to read a particular image is input, the CPU 31 controls the barcode reader 400 to reads the image 54 of the first barcode or the image 55 of the second barcode printed on the sheet 51, or the CPU 31 controls the scanner 11 to reads the image 61 of the checkbox and the image 62 of the barcode.

As far as printed on the same sheet 51, the image 54 of the first barcode, the image 55 of the second barcode, the image 61 of the checkbox, the image 62 of the barcode may be printed on a surface different from the surface on which the prescription is printed. For example, the image 55 of the second barcode and the image 61 of the checkbox may be printed on a back side of the sheet 51, which the image 54 of the first barcode, the image 62 of the barcode may be printed on the front side together with the image 52 of the image data of the prescription.

The particular image may not include the status update information. For example, the image 61 of the checkbox may not be printed.

When the prescriptions are printed, ones which have not been printed may be selected and printed collectively.

The acceptance information database 35 may be stored in the NVRAM 34 of the external device 500 instead of the RAM 33.

The "status" item may not be provided to the acceptance information database 35. In such a case, the process of S27 (FIG. 6 and FIG. 10), and S32 (FIG. 7) may be omitted so that the setting of the "status" item may not be changed.

It is noted that the "dispensing date/time" item or the "delivered date/time" item may not be provided to the acceptance information database 35. In such a case, processes of S28 (FIG. 6 and FIG. 10) and S33 (FIG. 7) may be omitted so that the "dispensing date/time" or "delivered date/time" are not stored.

The MFP 200 may be configured such that the CPU 31 can set "acquired" or "dispensing completed" in the "status" item of the acceptance information database 35 but does not set "delivered". In such a configuration, the image 55 of the second barcode or the image 61 of the checkbox may not be printed on the sheet 51, and the process in S31-S36 may be omitted. In this case, however, after S28 (FIG. 6 and FIG. 10), only S35, or both S34 and S35 (FIG. 7) may be inserted. That is, immediately after transmitting the completion notification, the acceptance information record having the corresponding ID may be deleted from the acceptance information database 35. Further, before the deletion process described above, the e-mail address and the image data of the prescription may be transmitted to the external device 500 and the work log may be remained in the external device 500.

It is noted that the process of S35 (FIG. 7) may be omitted. That is, after transmitting the completion notification, the acceptance information record corresponding to the notification may not be deleted from the acceptance information database 35. Further, the process of S34 (FIG. 7) may be omitted. That is, the work log may not be remained in the external device 500 before the acceptance information record is deleted.

Nest to the image 54 of the first barcode and the image 55 of the second barcode, information indicating the order and timing of reading barcodes with the barcode reader 400 may be printed. For example, a number representing the order of reading and/or a character string such as "when notifying" or "when delivered" representing a timing of reading the barcode may be printed next to each of the images 54 and 55.

The MFP 200 may be configured to employ only one of the automatic printing of the prescriptions as described in the first and second embodiments and the manual printing as described in the third embodiment, or both of them in a selectable manner.

The processes disclosed in the above-described embodiment may be executed by hardware such as a single CPU, a plurality of CPU's and/or an ASIC or a combination thereof. Further, the processes disclosed in the embodiment may be realized by a non-transitory computer-readable recording medium containing programs to execute such processes, methods of performing such processes and/or any other suitable modes.

What is claimed is:

1. An image forming apparatus, comprising:
   a printer;
   a communication device configured to communicate with a mail server;
   an image reader;
   a storage; and
   a controller configured to execute:
   receiving an e-mail stored in the mail server by controlling the communication device;
   generating identification information corresponding to image data attached to the received e-mail;
   storing the identification information, a transmission source address of the received e-mail, and the image data in the storage in an associated manner;
   controlling the printer to print a particular image corresponding to the identification information and an image of the image data corresponding to the identification information on a sheet;
   identifying the identification information corresponding to the particular image on the sheet read by the image reader,
   retrieving, from the storage, the transmission source address corresponding to the identification information read by the image reader; and
   controlling the communication device to transmit an e-mail to the transmission source address retrieved through the mail server.

2. The image forming apparatus according to claim 1, wherein the storage stores status information corresponding to the identification information, and
   wherein the controller further stores the status information corresponding to the identification information retrieved and identified as the status information indicating a particular status.

3. The image forming apparatus according to claim 2, wherein the status information indicating a first status is stored in the storage in association with the identification information when the image forming process is executed, and
   wherein the status information corresponding to the identification information identified is changed to the status information indicating a second status after transmitting the email to the transmission source address retrieved.

4. The image forming apparatus according to claim 3, wherein the controller is configured to:
retrieve the status information corresponding to the identification information identified;
when the status information retrieved indicates the first status, the status information is changed to the second status after transmitting the email to the transmission source address retrieved; and
when the status information does not indicate the first status, the controller does not retrieve the transmission source address and transmit the email to the transmission source address, and wherein the status information remains the same.

5. The image forming apparatus according to claim 2, wherein the controller is configured to:
retrieve the status information corresponding to the identification information identified; and
when the status information retrieved indicates a first status, change the status information to status information indicating a second status; and
when the status information retrieved indicates the second status, change the status information to status information indicating a third status.

6. The image forming apparatus according to claim 5, wherein when printing a particular image the controller is configured to:
form, a first particular image and a second particular image, as the particular images, the first particular image including the identification information and a command to change the status information corresponding to the identification information stored in the storage to the second status information, the second particular image including the identification information and a command to change the status information corresponding to the identification information stored in the storage to the third status information;
when the identification information is identified from the first particular image the status information corresponding to the identification information stored in the storage is changed to the status information indicating the second status in accordance with the command included in the first particular image and wherein the changed status information is stored in the storage; and
when the identification information is identified from the second particular image, the status information corresponding to the identification information stored in the storage is changed to the status information indicating the third status in accordance with the command included in the second particular image and wherein the changed status information is stored in the storage.

7. The image forming apparatus according to claim 6, wherein, when the status information stored in the storage is changed from the status information indicating the second status to the status information indicating the third status, the controller is configured to delete the e-mail transmission source address of the e-mail attaching the image data corresponding to the identification information identified and the image data corresponding to the identification information identified from the storage.

8. The image forming apparatus according to claim 5, wherein the controller is configured to:
form, as the particular image, the identification information and a frame image on the sheet;
identify the identification information and the frame image in the particular image;
determine whether an image surrounded by the frame image identified is same as the image within an area surrounded by a frame image formed; and
when the controller determines that an image surrounded by the frame image identified is different from an image within an area surrounded by a frame image formed, the controller does not retrieve the transmission source address and transmit the email to the transmission source address, and stores the status information corresponding to the identification information identified as the status information indicating the third status.

9. The image forming apparatus according to claim 2, wherein the controller stores date/time information corresponding to the status information and indicating date and time when the status information was stored in the storage, and
wherein, when the status information stored in the storage is changed, the controller additionally stores the date/time information corresponding to the updated status information in the storage.

10. The image forming apparatus according to claim 2, wherein the controller stores date/time information corresponding to the status information and indicating date and time when the status information was stored, in the storage, and
wherein, when the status information stored in the storage is changed, the controller changes the date/time information corresponding to the status information which is changed to information indicating date and time when the status information was changed.

11. The image forming apparatus according to claim 1, wherein, after transmitting the email to the transmission source address retrieved, the controller is configured to delete a transmission source address of the e-mail to which the image data corresponding to the identification information identified is attached and the image data corresponding to the identification information identified from the storage.

12. The image forming apparatus according to claim 11, wherein, after transmitting the email to the transmission source address retrieved, the controller is configured to control the communication device to transmit a transmission source address of the e-mail to which the image data corresponding to the identification information identified is attached and information regarding the image data corresponding to the identification information identified to an external device, and wherein after completion of transmission of the transmission source address and the information regarding the image data to the external device, the controller is configured to delete the transmission source address and the image data corresponding to the identification information identified.

13. The image forming apparatus according to claim 1, further comprising an operation device,
wherein the controller is configured to control the image reader, when the operation device receives an operation to instruct reading of the particular image, to read the particular image from the sheet on which an image is formed.

14. The image forming apparatus according to claim 1, wherein the image reader includes a barcode reader, wherein the controller is configured to:

when printing the particular image, form an image of a barcode corresponding to the identification information as the particular image on the sheet; and when the controller controls the barcode reader to read an image of the barcode formed on the sheet, identify the identification information in the image of the barcode read by the barcode reader.

15. The image forming apparatus according to claim 1, further comprising an operating device, wherein, when the operation device receives an operation instructing formation of an image of a particular image data, the controller is configured to retrieve the particular image data, and the identification information corresponding to the particular image data; and control the printer to print a particular image corresponding to the retrieved identification information and an image corresponding to the retrieved image data.

16. The image forming apparatus according to claim 15, wherein the storage is configured to store status information corresponding to the identification information, wherein, when new identification information is stored in the storage, the status information corresponding to the new identification information is stored in the storage as status information indicating a fourth status, and wherein, when an image corresponding to the image data is formed, the status information corresponding to the identification information corresponding to the image data is changed from the status information indicating the fourth status to the status information indicating the first status.

17. An information notifying method comprising:

receiving an e-mail stored in a mail server through a network interface, generating identification information corresponding to image data attached to the received e-mail;

storing, in a storage, the identification information, a transmission source address of the received e-mail, and the image data, in an associated manner, causing a printer to print a particular image corresponding to the identification information;

identifying the identification information in the particular image read by an image reader;

retrieving, from the storage, the transmission source address to which the image data corresponding to the identification information identified; and transmitting an e-mail addressed to the transmission source address retrieved to the mail server through the network interface.

18. A non-transitory computer-readable recording medium storing instructions for an image forming apparatus, wherein the instructions cause, when executed by a computer, the image forming apparatus to execute:

receiving an e-mail stored in a mail server through a network interface, generating identification information corresponding to image data attached to the received e-mail;

storing, in a storage, the identification information, a transmission source address of the received e-mail, and the image data, in an associated manner, causing a printer to print a particular image corresponding to the identification information;

identifying the identification information in the particular image read by an image reader;

retrieving, from the storage, the transmission source address to which the image data corresponding to the identification information identified; and transmitting an e-mail addressed to the transmission source address retrieved to the mail server through the network interface.

* * * * *